US006462967B1

(12) United States Patent
Fujisawa et al.

(10) Patent No.: US 6,462,967 B1
(45) **Date of Patent: *Oct. 8, 2002**

(54) POWER SUPPLY DEVICE, CONTROL METHOD FOR THE POWER SUPPLY DEVICE, PORTABLE ELECTRONIC DEVICE, TIMEPIECE, AND CONTROL METHOD FOR THE TIMEPIECE

(75) Inventors: Teruhiko Fujisawa, Shiojiri; Makoto Okeya, Nagano-ken, both of (JP)

(73) Assignee: Seiko Epson Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/454,264

(22) Filed: Dec. 3, 1999

(30) Foreign Application Priority Data

Dec. 9, 1998 (JP) .......................................... 10-350496
Sep. 30, 1999 (JP) .......................................... 11-280719

(51) Int. Cl.[7] .................................................. H02J 1/02
(52) U.S. Cl. ........................................... 363/39; 363/37
(58) Field of Search ................................ 368/204, 205, 368/206; 363/39, 59, 60, 61, 62, 37; 232/299, 303, 220

(56) References Cited

U.S. PATENT DOCUMENTS 4,437,769 A * 3/1984 Shida et al. ................ 368/204
4,441,826 A * 4/1984 Morokawa et al. ......... 368/204
4,730,287 A * 3/1988 Yoshino et al. ............. 368/205
4,733,158 A * 3/1988 Marchione et al. ......... 323/258
4,785,435 A * 11/1988 Inoue et al. ................ 368/205
4,812,736 A * 3/1989 Albach et al. .............. 323/224
5,001,685 A * 3/1991 Hayakawa .................. 368/204
5,414,340 A * 5/1995 Gannon ....................... 323/269
5,526,253 A * 6/1996 Duley .......................... 363/60
5,835,457 A * 11/1998 Nakajima ................... 368/205

FOREIGN PATENT DOCUMENTS

JP 62-30391 7/1987

* cited by examiner

*Primary Examiner*—Bao Q. Vu
*Assistant Examiner*—Gary L. Laxton

(57) ABSTRACT

An oscillation circuit 80 produces an oscillation signal in accordance with the oscillation frequency of a quartz oscillator 81, and a frequency dividing circuit 90 divides the frequency of the oscillation signal to produce a sampling clock CKs having a duty ratio of 1/8. A constant-voltage circuit 70 is operated during the period in which the sampling clock CKs takes an "H" level, and is stopped during the period in which the sampling clock CKs takes an "L" level. During the period in which the constant-voltage circuit 70 stops the operation, a voltage Vreg affected by fluctuations in a second lower potential side voltage Vss2 is generated. However, since the cycle of the sampling clock CKs is short, a fluctuation width of the voltage Vreg is suppressed. Power consumption of the constant-voltage circuit 70 is reduced.

130 Claims, 12 Drawing Sheets

| STEP-UP AMPLIFICATION | CONNECTION | SW1 | SW2 | SW3 | SW4 | SW11 | SW12 | SW13 | SW14 | SW21 |
|---|---|---|---|---|---|---|---|---|---|---|
| 3x | PARALLEL | ON | OFF | ON | OFF | ON | OFF | ON | OFF | OFF |
| | SERIAL | OFF | ON | OFF | OFF | OFF | OFF | OFF | ON | ON |
| 2x | PARALLEL | ON | OFF | ON | OFF | ON | OFF | ON | OFF | OFF |
| | SERIAL | OFF | ON | OFF | ON | OFF | ON | OFF | ON | OFF |
| 1.5x | PARALLEL | ON | OFF | OFF | OFF | OFF | OFF | ON | OFF | ON |
| | SERIAL | OFF | ON | OFF | ON | OFF | ON | OFF | ON | OFF |
| NO STEP-UP | PARALLEL | OFF | ON | ON | ON | OFF | ON | ON | ON | OFF |
| | SERIAL | OFF | ON | ON | ON | OFF | ON | ON | ON | OFF |
| 1/2x | PARALLEL | ON | OFF | OFF | OFF | OFF | OFF | ON | OFF | ON |
| | SERIAL | ON | OFF | OFF | ON | ON | OFF | OFF | ON | OFF |

FIG._4

| CONTROL SIGNAL | | | SELECTION SIGNAL |
|---|---|---|---|
| CTL1 | CTL2 | CTL 3 | |
| L | L | L | CK1 |
| H | L | L | CK2 |
| L | H | L | CK3 |
| H | H | L | CK3 |
| L | L | H | H |
| H | L | H | H |
| L | H | H | H |
| H | H | H | H |

POWER SUPPLY DEVICE, CONTROL METHOD FOR THE POWER SUPPLY DEVICE, PORTABLE ELECTRONIC DEVICE, TIMEPIECE, AND CONTROL METHOD FOR THE TIMEPIECE

BACKGROUND OF THE INVENTION

1. Field of the Invention

The present invention relates to a power supply device suitable for reducing power consumption, a control method for the power supply device, a portable electronic device, a timepiece, and a control method for the timepiece.

2. Description of the Related Art

Small-sized electronic watches in the form of, e.g., wristwatches have been realized, each of the watches incorporating a power generator in addition to both a clocking circuit for counting time and a driving circuit for driving a motor coupled to a hand moving mechanism. Such devices operate with replaceable batteries. Those electronic watches have a function of charging electric power generated by power generators in capacitors, etc., and indicate the time of day with the power discharged from the capacitors when power is not generated.

Those electronic watches can therefore operate with stability for a long time without batteries. In consideration of the inconvenience of replacing batteries and a problem incidental to disposal of exhausted batteries, it is expected that power generators will be incorporated in more and more electronic watches in the future.

A power generator incorporated in a wristwatch, etc. comprises, for example, a solar cell for converting irradiated light to electrical energy, or a power generating system for capturing motion of the user's arm, etc. and converting kinetic energy to electrical energy. Such a power generator is very superior in utilizing energy present in environment of the user for conversion to electrical energy, but has problems that utilizable energy density is low and energy cannot be obtained in continuous fashion. Accordingly, power generation can not be continuously performed, and the electronic watch operates with the power accumulated in a capacitor while the power generation is suspended.

Because a power generator incorporated in a small-sized electronic watch has a small electromotive voltage, the voltage produced between terminals of a capacitor is not sufficient to operate a clocking circuit. For this reason, the voltage produced between the terminals of the capacitor is stepped up, and the stepped-up voltage is accumulated in second capacitor. Also, in order so that a stable source voltage is supplied regardless of fluctuations in the stepped-up voltage, the voltage across the second capacitor is stabilized using a constant-voltage circuit, and the stabilized voltage is supplied as a source voltage to the clocking circuit.

In the above electronic watch, to prolong a period of time during which the watch can be continuously used, total power consumption of the electronic watch must be reduced.

However, the constant-voltage circuit, itself, consumes power. It is therefore not preferable to operate the constant-voltage circuit at all times from the viewpoint of reducing power consumption. On the other hand, the constant-voltage circuit is essential to operate the clocking circuit in a stable way without malfunction.

OBJECTS OF THE INVENTION

Therefore, it is an object of the present invention to overcome the aforementioned problems.

The present invention has been made in view of the above situations in the art, and its object is to reduce power consumption by operating a constant-voltage circuit in a sampling (intermittent) manner.

Another object of the present invention is to control a constant-voltage circuit in accordance with fluctuations in an input voltage, thereby reducing power consumption and stabilizing a source voltage.

SUMMARY OF THE INVENTION

To solve the above problems, a power supply device according to the present invention is characterized in comprising a voltage stabilizer circuit or stabilizing means for producing an output voltage resulting from stabilizing an input voltage when supplied with power, a power supply or power supply means for supplying power to the voltage stabilizing circuit or means, a voltage fluctuation detector or detecting means for detecting a fluctuation in the input voltage or a condition in which a fluctuation in the input voltage is expected, and a controller or control means for controlling the power supply operation of the power supply means in accordance with a result detected by the voltage fluctuation detector or detecting means.

With the above features of the present invention, since the power supply operation of the power supply means can be controlled in accordance with fluctuations in the input voltage, the output voltage can be stabilized and power consumption can be reduced.

More concretely, the control means may control the power supply means so as to supply power to the voltage stabilizing means and stop the supply of power at a certain period when the input voltage is stable. When the voltage fluctuation detecting means detects a fluctuation in the input voltage or a condition in which the a fluctuation in the input voltage is expected, the control means may also cause the power supply means to set a ratio (defined as a time during which power is supplied to the voltage stabilizing means versus a time during which power is stopped) to a greater value than when the input voltage is stable. With the above features of the present invention, when the input voltage fluctuates, the time during which power is supplied can be prolonged so that the output voltage can be stabilized. On the other hand, when the input voltage is stable, the time during which the power supply is stopped can be prolonged so that the power consumption can be reduced.

Also, the control means may control the power supply means so as to intermittently supply power to the voltage stabilizing means when the input voltage is stable, and control the power supply means so as to supply power to the voltage stabilizing means at all times when the voltage fluctuation detecting means detects a fluctuation in the input voltage or a condition in which a fluctuation in the input voltage is expected. In this case, when the input voltage fluctuates, the voltage stabilizing means is operated at all times and therefore the output voltage can be further stabilized.

A portable electronic device according to the present invention is characterized in comprising the above power supply device, power generating means for generating power, and an electricity accumulator or accumulating means for accumulating the power from the power generating means and supplying an accumulated voltage, as the input voltage, to the power supply device. The voltage fluctuation detecting means is constituted as a charging detector or detecting means for detecting charging into the electricity accumulating means. In this case, fluctuations in the input voltage due to an internal resistance of the electricity accumulating means can be monitored by detecting charging into the electricity accumulating means.

In this connection, the charging detecting means may detect charging into the electricity accumulating means in accordance with a charging current flowing into the electricity accumulating means, or may detect charging into the electricity accumulating means in accordance with an electromotive voltage generated by the power generating means.

A portable electronic device according to the present invention is characterized in comprising the above power supply device, power generating means for generating power, first electricity accumulating means for accumulating the power from the power generating means, voltage transforming means for transforming a voltage of the first electricity accumulating means at a transformation amplification depending on the magnitude of the voltage of the first electricity accumulating means, and second electricity accumulating means for accumulating a voltage transformed by the voltage transforming means and supplying an accumulated voltage, as the input voltage, to the power supply device. The voltage fluctuation detecting means being constituted as an amplification change detector or detecting means for detecting a change of the transformation amplification in the voltage transforming means. In this case, fluctuations in the input voltage can be detected in accordance with a change of the transformation amplification.

A portable electronic device according to the present invention is characterized in comprising the above power supply device, a power consumer or consuming means for receiving stabilized power from the input voltage and consuming the received power, the voltage fluctuation detecting means being constituted as power consumption detector or detecting means for detecting an increase of power consumption in the power consuming means. More concretely, the power consuming means is a motor, and the power consumption detecting means detects an increase of power consumption in accordance with a driving supply voltage for the motor. In this case, fluctuations in the input voltage can be detected in accordance with an increase of power consumption.

In the portable electronic device according to the present invention, preferably, the control means controls the power supply means so as to repeat supply of power to the voltage stabilizing means and stop of the power supply at a certain cycle when the input voltage is stable, and controls the power supply means so as to set a ratio of time during which power is supplied to the voltage stabilizing means to time during which the power supply is stopped to a greater value than the ratio set in the case of the input voltage being stable, when the voltage fluctuation detecting means detects a fluctuation in the input voltage or a condition in which a fluctuation in the input voltage is expected. Further, the control means may control the power supply means so as to set a ratio of time during which power is supplied to the voltage stabilizing means to time during which the power supply is stopped to a greater value for a certain preset period than the ratio set in the case of the input voltage being stable, when the voltage fluctuation detecting means detects a fluctuation in the input voltage or a condition in which a fluctuation in the input voltage is expected.

Also, preferably, the control means controls the power supply means so as to intermittently supply power to the voltage stabilizing means when the input voltage is stable, and controls the power supply means so as to supply power to the voltage stabilizing means at all times when the voltage fluctuation detecting means detects a fluctuation in the input voltage or a condition in which a fluctuation in the input voltage is expected. Further, the control means may control the power supply means so as to supply power to the voltage stabilizing means at all times for a certain preset period when the voltage fluctuation detecting means detects a fluctuation in the input voltage or a condition in which a fluctuation in the input voltage is expected.

A timepiece according to the present invention is characterized in comprising the above power supply device, and a clock or clocking means supplied with power by receiving an output voltage from the power supply device and counting time. In this case, the clocking means can be operated with stability, and at the same time power consumption can be reduced.

A timepiece according to the present invention may comprise power generating means for generating power, electricity accumulating means for accumulating the power from the power generating means, voltage stabilizing means for producing an output voltage resulted from stabilizing an input voltage, power supply means for supplying power to the voltage stabilizing means while a voltage accumulated in the electricity accumulating means is employed as the input voltage, voltage fluctuation detecting means for detecting a fluctuation in the input voltage or a condition in which a fluctuation in the input voltage is expected, control means for controlling the power supply operation of the power supply means in accordance with a result detected by the voltage fluctuation detecting means, and clocking means supplied with power by receiving an output voltage from the voltage stabilizing means and counting time.

A timepiece according to the present invention may comprise power generating means for generating power, a first electricity accumulating circuit or means for accumulating the power from the power generating means, a voltage transformer or transforming means for transforming a voltage of the first electricity accumulating means at a transformation amplification depending on the magnitude of the voltage of the first electricity accumulating means, a second electricity accumulating circuit or means for accumulating a voltage transformed by the voltage transforming means and supplying an accumulated voltage, voltage stabilizing means for producing an output voltage resulted from stabilizing an input voltage, a power supply or power supply means for supplying power to the voltage stabilizing means while the voltage accumulated in the second electricity accumulating means is employed as the input voltage, amplification change detector or detecting means for detecting a change of the transformation amplification in the voltage transforming means, a controller or control means for controlling the power supply operation of the power supply means in accordance with a result detected by the amplification change detecting means, and a clock or clocking means supplied with power by receiving the output voltage from the voltage stabilizing means and counting time.

A control method for a power supply device including a constant-voltage circuit for producing an output voltage resulted from stabilizing an input voltage when supplied with power, according to the present invention, is characterized in comprising a first step of supplying power to the constant-voltage circuit for a first preset time, and a second step of stopping the supply of power to the constant-voltage circuit for a second present time after the lapse of the first time, the first step and the second step being repeated alternately subsequent to the end of the second step.

With the above features of the present invention, the constant-voltage circuit alternately repeat the power supply state and the power supply stopped state. The output voltage fluctuates depending on the input voltage in the power supply stopped state, but the output voltage resulted from stabilizing the input voltage is produced in the power supply state, thus resulting in a small fluctuation width of the output voltage. It is therefore possible to reduce power consumption while suppressing the fluctuation width of the output voltage.

A control method for a power supply device including a constant-voltage circuit for producing an output voltage resulted from stabilizing an input voltage when supplied with power, according to the present invention, is characterized in comprising the steps of detecting a fluctuation in the input voltage or a condition in which a fluctuation in the input voltage is expected, and controlling supply of power to the constant-voltage circuit in accordance with a detected result. With the above features of the present invention, since the power supply operation can be controlled in accordance with a fluctuation in the input voltage or a condition in which such a fluctuation is expected, the output voltage can be further stabilized and the power consumption can be further reduced.

A control method for a timepiece including a constant-voltage circuit for producing an output voltage resulted from stabilizing an input voltage when supplied with power, and a clocking circuit supplied with power by receiving the output voltage and counting time, according to the present invention, is characterized in comprising the steps of accumulating generated power in a first electricity accumulator, transforming a voltage of the first electricity accumulator at a transformation amplification depending on the magnitude of the voltage of the first electricity accumulator, accumulating a transformed voltage in a second electricity accumulator and supplying an accumulated voltage, as the input voltage, to the constant-voltage circuit, receiving power supplied from the second electricity accumulator and driving a motor to rotate hands for indicating the time of day in accordance with a result counted by the clocking circuit, detecting at least one of charging into the first electricity accumulator, a change of the transformation amplification, and driving of the motor, and controlling supply of power to the constant-voltage circuit and stop of the power supply in accordance with a detected result.

With the above features of the present invention, a factor that fluctuates the input voltage, i.e., at least one of charging into the first electricity accumulator, a change of the transformation amplification, and driving of the motor is detected. Therefore, the supply of power to the constant-voltage circuit and stop of the power supply can be properly controlled. As a result, the clocking circuit can be operated with stability, and at the same time the power consumption can be reduced.

In the above control method, preferably, when it is determined from the detected result that the input voltage is stable, power is intermittently supplied to the constant-voltage circuit, and when it is determined from the detected result that the input voltage is fluctuated or a fluctuation in the input voltage is expected, a ratio of time during which power is supplied to the constant-voltage circuit to time during which the power supply is stopped is set to a greater value than the ratio set in the case of the input voltage being stable, or power is supplied to the constant-voltage circuit at all times.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

FIG. 4 is a table for explaining the operation of the voltage step-up/down circuit 40 in FIG. 2;

DESCRIPTION OF THE PREFERRED EMBODIMENTS

1. First Embodiment

[1-1 Entire Construction]

Figure 1:
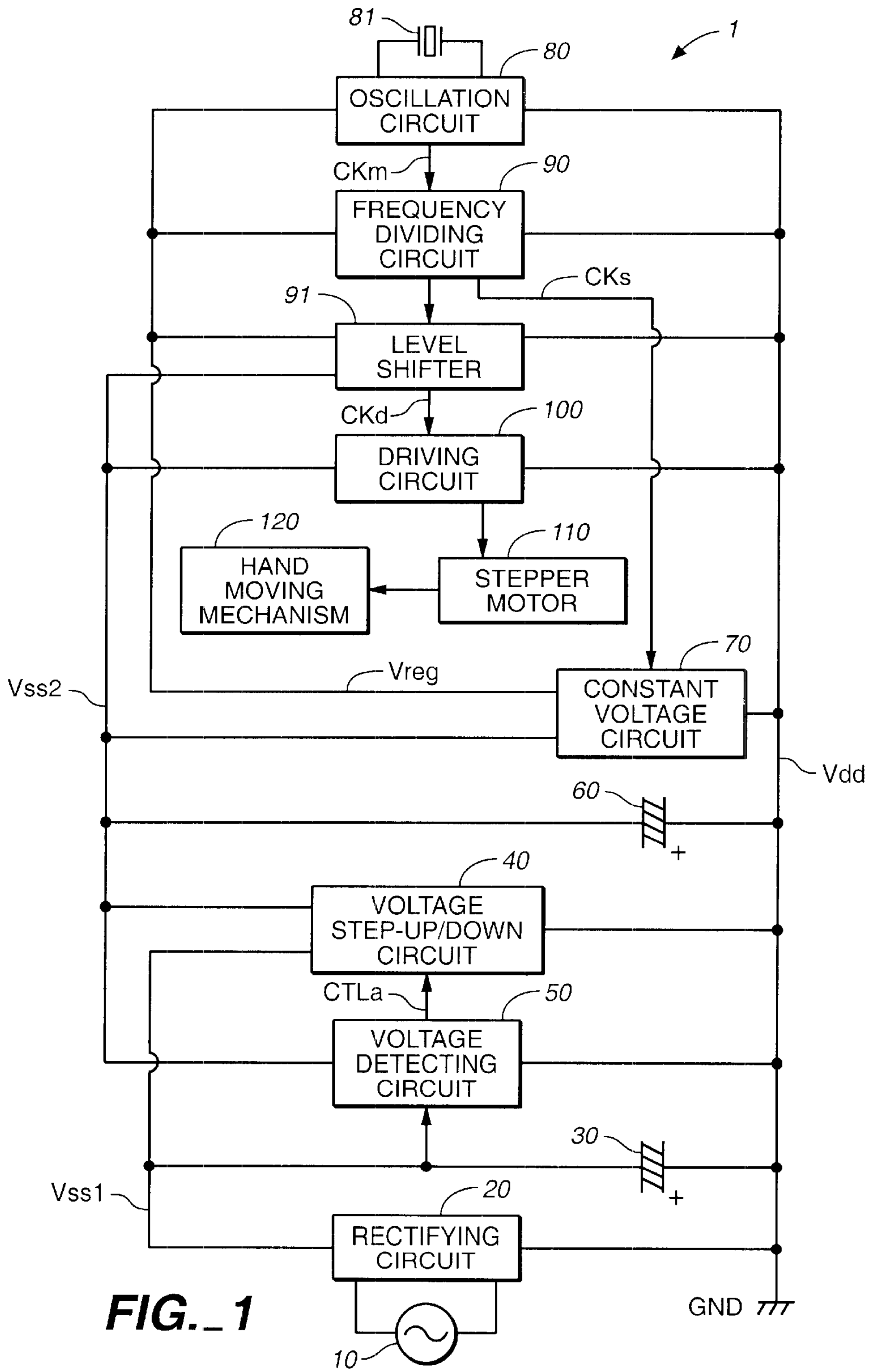
FIG. 1 is a block diagram showing a construction of a timepiece according to a first embodiment of the present invention.

A first embodiment of the present invention will be described below with reference to the drawings. FIG. 1 is a block diagram showing a schematic construction of a timepiece 1 according to the first embodiment of the present invention.

The timepiece 1 is, for example, a wristwatch, and when used, a belt connected to a timepiece body is wound around the user's wrist.

Numeral 10 denotes an AC power generator. The AC power generator employed in this embodiment is of the electromagnetic induction type including a rotating weight, wherein a power generation rotor coupled to the rotating weight is rotated within a power generation stator, and electric power induced in a power generation coil, which is connected to the power generation stator, can be externally outputted. Numeral 20 denotes a rectifying circuit connected to the AC power generator 10 and performing half-wave or full-wave rectification to charge power in a large-capacity capacitor 30. In this embodiment, a voltage Vdd (higher potential side voltage) on the higher potential side of the large-capacity capacitor 30 is set to a reference potential GND, but a voltage Vss1 (lower potential side voltage) on the lower potential side of the large-capacity capacitor 30 may be set to the reference potential GND.

Numeral 40 denotes a voltage step-up/down circuit 40 for stepping up or down the voltage between both terminals of the large-capacity capacitor 30 and supplying the stepped-up or -down voltage to a capacitor 60. Here, a value resulted from dividing the voltage inputted to the voltage step-up/down circuit 40 by the voltage outputted therefrom is called a step-up/down amplification K. A voltage detecting circuit 50 supplies a step-up/down control signal CTLa, which indicates the step-up/down amplification K, to the voltage step-up/down circuit 40 in accordance with the lower potential side voltage Vss1 of the large-capacity capacitor 30. The step-up/down amplification K can take any value of $K>1$, $K=1$ and $K<1$. For example, if the magnitude of the voltage Vss1 is not sufficient to operate the various components of the timepiece 1, the voltage detecting circuit 50 produces the step-up/down control signal CTLa indicating $K>1$. On the other hand, if the voltage Vss1 is too large and the capacitor 60 is overcharged upon direct application of the voltage Vss1, the voltage detecting circuit 50 produces the step-up/down control signal CTLa indicating $K<1$. As a result, a proper voltage can be applied to the capacitor 60. Note that, in the following description, the voltage of the capacitor 60 on the lower potential side will be called a second lower potential side voltage Vss2. Numeral 70 denotes a constant-voltage circuit connected to both the terminals of the capacitor 60 for receiving the second lower potential side voltage Vss2 as an input voltage and outputting a voltage Vreg resulted from stabilizing the input voltage. The constant-voltage circuit 70 is constructed so as to output a constant voltage regardless of fluctuations in the input voltage or load current when it is supplied with power. The constant-voltage circuit 70 is intermittently supplied with power in accordance with a sampling clock CKs. Though described later in more detail, the constant-voltage circuit 70 feedbacks the output voltage for the stabilizing operation during the period in which the sampling clock CKs takes an "H" level, but stops the stabilizing operation and holds the gate voltage of an output transistor 708 by a hold capacitor 715 (see FIG. 6) incorporated in the circuit 70 for rendering the output transistor 708 to flow a load current through it during the period in which the sampling clock CKs takes an "L" level. In the latter case, the voltage Vreg, i.e., the output voltage of the constant-voltage circuit 70, fluctuates depending on the second lower potential side voltage Vss2.

Here, the constant-voltage circuit 70 is constructed such that the circuit 70 consumes power for the operation of active elements incorporated therein during the stabilizing operation through feedback, but the circuit 70 stops supply of power to the active elements while the output voltage Vreg is being held by the hold capacitor 715. In this embodiment, a ratio of the "H" level period to one cycle of the sampling clock CKs (duty ratio R) is set to 1/8. Accordingly, the power consumption of the constant-voltage circuit 70 can be reduced to 1/8 of that in the case of operating the circuit 70 at all times.

Numeral 80 denotes an oscillation circuit which oscillates at the oscillation frequency of a quartz oscillator 81. Also, numeral 90 denotes a frequency dividing circuit which divides the frequency of a main clock CKm supplied from the oscillation circuit 80, and produces the sampling clock CKs and a driving clock CKd for driving second, minute and hour hands. The oscillation circuit 80 and the frequency dividing circuit 90 are connected between the voltage Vreg and the higher potential side voltage Vdd to be supplied with power. A total current consumed by both the circuits 80 and 90 is very small, i.e., on the order of approximately 50 nA. Numeral 91 denotes a level shifter for converting a level of the driving clock CKd. More specifically, the level shifter 91 converts the driving clock CKd which oscillates between the voltage Vreg and the higher potential side voltage Vdd, to another one which oscillates between the second lower potential side voltage Vss2 and the higher potential side voltage Vdd.

Numeral 100 denotes a driving circuit for producing driving pulses in accordance with the driving clock CKd. A stepper motor 110 is rotated in accordance with the number of driving pulses. A hand moving mechanism 120 comprising a wheel train and the second, minute and hour hands is coupled to the stepper motor 110. Accordingly, when the stepper motor 110 is driven with the driving pulses, torque is transmitted through the hand moving mechanism 120, thereby moving the second, minute and hour hands.

One example of a concrete construction of the AC power generator 10, the rectifying circuit 20, the voltage step-up/down circuit 40, the driving circuit 100, the stepper motor 110, and the hand moving mechanism 120, shown in FIG. 1, will now be described with reference to FIG. 2. The constant-voltage circuit 70, the oscillation circuit 80, etc. shown in FIG. 1 are omitted in FIG. 2.

First, the AC power generator 10 will be described. The AC power generator 10 comprises a power generating device 240, a rotating weight 245, and a speed-up gear 246. The power generating device 240 is constituted by an AC power generating device of the electromagnetic conduction type wherein a power generation rotor 243 is rotated within a power generation stator 242, and electric power induced in a power generation coil 244, which is connected to the power generation stator 242, is externally outputted. The rotating weight 245 functions as a means for transmitting kinetic energy to the power generation rotor 243. A motion of the rotating weight 245 is transmitted to the power generation rotor 243 through the speed-up gear 246. In the timepiece 1, for example, a wristwatch, the rotating weight 245 is arranged to be able to turn within the timepiece upon capturing motion of the user's arm, etc. Accordingly, power can be generated by utilizing energy from the user, and the timepiece 1 can be driven by employing the generated power.

Figure 2:
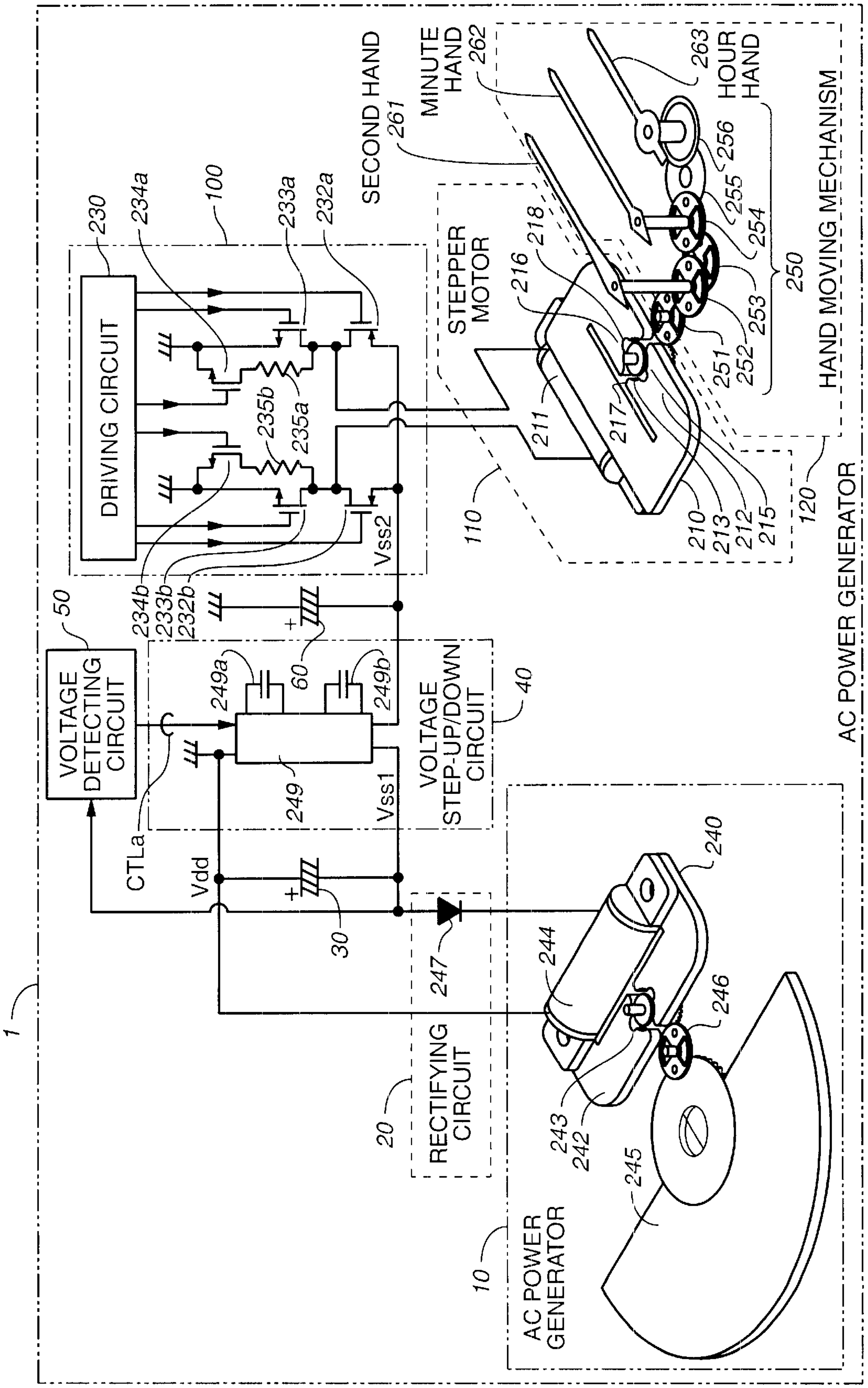
FIG. 2 shows one example of an AC power generator 10, a rectifying circuit 20, a voltage step-up/down circuit 40, a driving circuit 100, a stepper motor 110, and a hand moving mechanism 120 in the timepiece according to the first embodiment of the present invention.

The rectifying circuit 20 shown in FIG. 2 is constructed as a circuit for half-wave rectifying an output of the AC generator 10 by using a single diode 247 for rectification. As will be appreciated by one of ordinary skill in the art, the half-wave rectifying circuit may be replaced with a full-wave rectifying circuit that may comprise a plurality of active elements.

The voltage step-up/down circuit 40 comprises a plurality of capacitors 249*a* and 249*b* arranged to be able to step up and down a voltage in multiple steps. The voltage stepped up or -down by the voltage step-up/down circuit 40 is accumulated in the capacitor 60. In this arrangement, the voltage step-up/down circuit 40 comprises a switching network 249 that can adjust the voltage supplied to the capacitor 60 in accordance with the control signal CTLa from the voltage detecting circuit 50.

Figure 5:
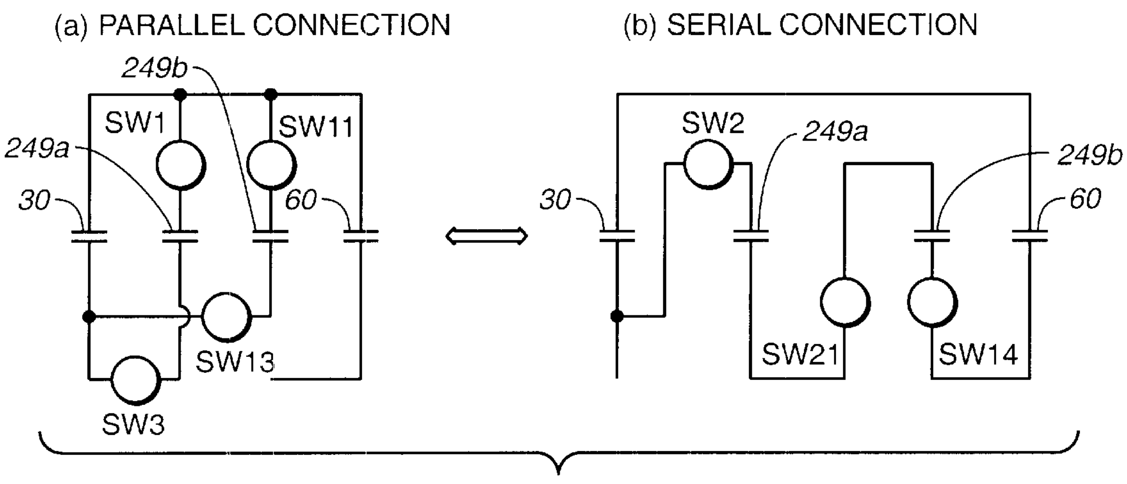
FIG. 5 shows an equivalent circuit of the voltage step-up/down circuit 40 in FIG. 2 at 3-times step-up configuration.

The voltage step-up/down circuit 40 will be next described in more detail with reference to FIGS. 3 to 5.

Figure 3:
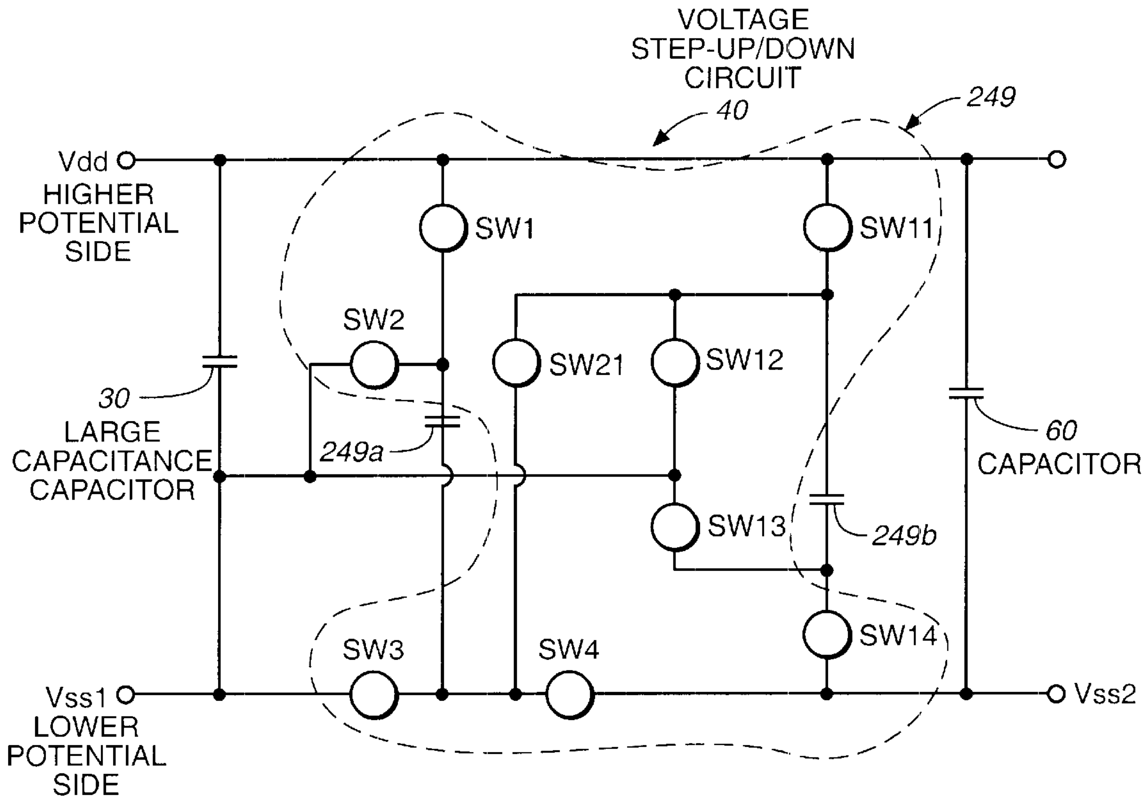
FIG. 3 is a schematic diagram of a voltage step-up/down circuit 40 in FIG. 2.

As shown in FIG. 3, switching network 249 comprises switches SW1, SW2, SW3, SW4, SW11, SW12, SW13, SW21 and SW14. Switch SW1 has one terminal connected to the higher potential side (Vdd) terminal of the large-capacity capacitor 30, and switch SW2 has one terminal connected to the other terminal of the switch SW1 and a second terminal connected to the lower potential side (Vss1) terminal of the large-capacity capacitor 30. Capacitor 249*a* has one terminal connected to the juncture between switch SW1 and switch SW2, and switch SW3 is connected between the second terminal of capacitor 249*a* and the lower potential side (Vss1) terminal of the large-capacity capacitor 30. One terminal of switch SW4 is connected between the lower potential side (Vss2) terminal of capacitor 60 and junction of capacitor 249*a* and switch SW3. One terminal of Switch SW11 is connected to the juncture between the higher potential side (Vdd) terminal of large-capacity capacitor 30 and the higher potential side terminal of capacitor 60. Switch SW12 has one terminal connected to the other terminal of the switch SW11 and a second terminal connected to the lower potential side (Vss1) terminal of the large-capacity capacitor 30. Capacitor 249*b* has one terminal connected to the juncture between switch SW11 and switch SW12, and the other terminal of capacitor 249*b* is connected to switch SW13. The other terminal of switch SW13 is connected to the juncture between the switch SW12 and the lower potential side (Vss1) terminal of large-capacity capacitor 30. Switch SW14 has one terminal connected to the juncture between capacitor 249*b* and switch SW13, and has the second terminal connected to the lower potential side (Vss2) terminal of capacitor 60. One terminal of switch SW21 is connected to the juncture between switch SW11 and switch SW12, and the second terminal of switch SW21 is connected to the juncture between capacitor 249*a*, switch SW3 and switch SW4.

Summary of the operation of the voltage step-up/down circuit will now be described with reference to FIGS. 4 and 5 in connection with, for example, a 3-times step-up mode. The voltage step-up/down circuit 40 is operated in accordance with predetermined step-up/down clocks (not shown). In the 3-times step-up mode, as shown FIG. 4, at the timing of a first step-up/down clock (at the timing of parallel connection), switch SW1 is turned on, switch SW2 is turned off, switch SW3 is turned on, switch SW4 is turned off, switch SW11 is turned on, switch SW12 is turned off, switch SW13 is turned on, switch SW14 is turned off, and switch SW21 is turned off. In this case, the voltage step-up/down circuit 40 is represented by an equivalent circuit, shown in the left side portion of FIG. 5, in which power is supplied to both capacitors 249*a* and 249*b* from large-capacity capacitor 30, and the capacitors 249*a* and 249*b* are charged until the voltages across them become almost equal to the voltage across the large-capacity capacitor 30.

Then, at the timing of a second step-up/down clock (at the timing of serial connection), switch SW1 is turned off, switch SW2 is turned on, switch SW3 is turned off, switch SW4 is turned off, switch SW11 is turned off, switch SW12 is turned off, switch SW13 is turned off, switch SW14 is turned on, and switch SW21 is turned on. In this case, the voltage step-up/down circuit 40 is represented by an equivalent circuit, shown in the right side portion of FIG. 5, in which large-capacity capacitor 30 and capacitors 249*a* and 249*b* are connected in series. Accordingly, capacitor 60 is charged to a voltage as high as three times that across large-capacity capacitor 30, and a 3-times amplification or step-up of the voltage is realized.

Stepper motor 100 and hand moving mechanism 120, shown in FIG. 2, will be next described. Stepper motor 100 is also called a pulse motor, a stepping motor, a step-moving motor, or a digital motor, and is a motor driven with a pulse signal and employed as an actuator in many digital control devices. Recently, stepper motors with a smaller size and lighter weight have been used in many cases as actuators in small-sized electronic devices and information equipment which are suitable for being carried with users. Typical examples of those electronic devices are timepieces such as electronic watches, time switches, and chronographs.

Stepper motor 110 shown in FIG. 2 comprises a driving coil 211 for generating magnetic forces upon receiving driving pulses supplied from the driving circuit 100, a stator 212 excited by the driving coil 211, and a rotor 213 rotating within stator 212 under an excited magnetic field. Also, stepper motor 110 is of the PM type (permanent magnet rotating type) wherein rotor 213 comprises a two-pole permanent magnet in the form of a disk. Stator 212 includes a magnetism saturating portion 217 provided so that different magnetic poles are produced in respective phases (poles) 215 and 216 around rotor 213 with the magnetic forces generated by driving coil 211. Further, to restrict the direction of rotation of rotor 213, an internal notch 218 is provided at an appropriate position along an inner periphery of the stator 212 to produce cogging torque for stopping rotor 213 at the appropriate position.

The rotation of rotor 213 is transmitted to a second hand 261 through an intermediate second wheel 251, meshing rotor 213 via a pinion, and a second wheel (second indicating wheel) 252 in hand moving mechanism 120, thereby indicating the second. Then, the rotation of second wheel 252 is transmitted to minute hand 262 and hour hand 263 through an intermediate minute wheel 253, a minute indicating wheel 254, a minute wheel 255, and an hour wheel (hour indicating wheel) 256. Minute hand 262 is connected to minute indicating wheel 254, and hour hand 263 is connected to hour wheel 256. The hour and minute are indicated by the respective hands in conjunction with the rotation of the rotor 213.

Of course, it is possible that, though not shown, a transmitting system for indicating the year, month and day (calendar), etc. (e.g., an intermediate hour wheel, an intermediate date wheel, a date indicator driving wheel, and a date indicator in the case of indicating the date) is also connected to the wheel train 250 made up of the wheels 251–256. In such a case, a calendar correction system wheel train (e.g., a first calendar correction transmitting wheel, a second calendar correction transmitting wheel, a calendar correction wheel, and a date indicator) may also be additionally provided.

Driving circuit 100 shown in FIG. 2 will be next described. Driving circuit 100 supplies various driving pulses to stepper motor 110 under control of a driving pulse control circuit 230 comprising a combinational logic circuit. Driving circuit 100 comprises a bridge circuit made up of a p-channel MOS 233*a* connected to an n-channel MOS 232*a*, and a p-channel MOS 233*b* connected to an n-channel MOS 232*b*. Driving circuit 100 further comprises rotation detecting resistors 235*a* and 235b connected respectively to p-channel MOS transistors 233*a* and 233*b*, and comprises p-channel MOS transistors 234*a* and 234*b* for supplying chopper pulses to resistors 235*a* and 235*b* for the purpose of sampling. By applying control pulses, which are different in polarity and pulse width, to the gate electrodes of MOS transistors 232*a*, 232*b*, 233*a*, 233*b*, 234*a* and 234*b* at the respective timings from driving pulse control circuit 230, driving pulses having different polarities can be supplied to driving coil 211, or detecting pulses for detecting the rotation of rotor 213 and for exciting an induced voltage to detect a magnetic field can be supplied.

[1-2: Constant-voltage Circuit]

The construction of constant-voltage circuit 70 will be next described with reference to FIG. 6.

Figure 6:
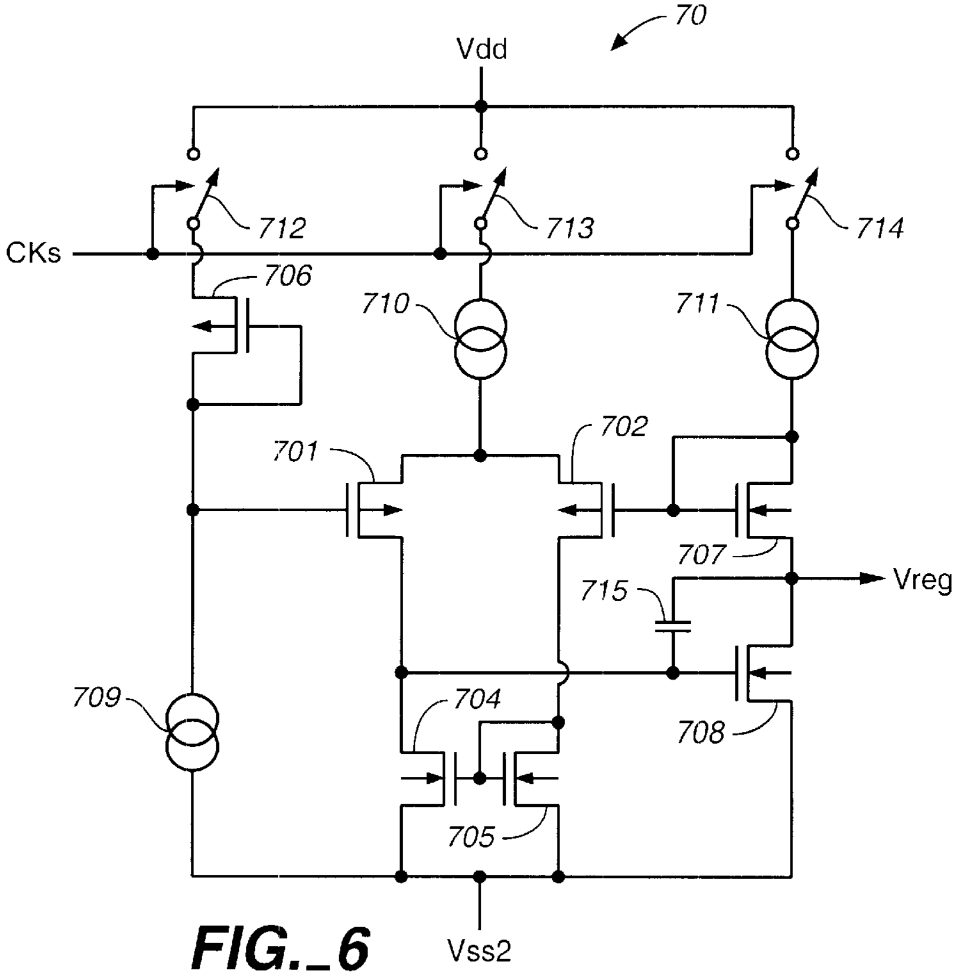
FIG. 6 is a circuit diagram of a constant-voltage circuit according to the embodiment shown in FIG. 1.

FIG. 6 shows a circuit configuration of constant-voltage circuit 70.

As shown in FIG. 6, constant-voltage circuit 70 mainly comprises input transistors 701, 702, load transistors 704, 705, a transistor 706 for generating a reference voltage, output transistors 707, 708, constant-current sources 709–711, switches 712–714, and a hold capacitor 715. Of those components, input transistors 701, 702 and transistor 706 comprise each a P-channel field effect transistor, and load transistors 704, 705 and output transistors 707, 708 comprise each an N-channel field effect transistor.

On/off states of switches 712–714 are each controlled in accordance with the sampling clock CKs. During the period in which the sampling clock CKs takes an "H" level, the switches are turned on, and during the period in which the sampling clock CKs takes an "L" level, the switches are turned off. Accordingly, if the duty ratio R of the sampling clock CKs is set to 1/8, the constant-voltage circuit 70 operates for 1/8 of the total period, and therefore the power consumption of the constant-voltage circuit 70 can be reduced to 1/8 of that in the case of operating the circuit 70 at all times.

Drains of input transistors 701, 702 are connected respectively to the second lower potential side voltage Vss2 through load transistors 704, 705. In this case, load transistors 704, 705 function as active loads. Also, sources of the input transistors 701, 702 are connected respectively to constant-current source 710. Accordingly, input transistors 701, 702, load transistors 704, 705 and constant-current source 710 constitute a differential amplifier. Here, a gate of input transistor 701 corresponds to a positive input terminal of the differential amplifier, and a gate of input transistor 702 corresponds to a negative input terminal of the differential amplifier. In this embodiment, the gate voltage of input transistor 701 is almost equal to a threshold voltage Vth of transistor 706 and acts as a reference voltage.

Accordingly, when switches 712–714 are in the on-state, a feedback loop of input transistor 701→output transistor 708→output transistor 707→input transistor 702 is established, whereby a value of the voltage Vreg is stabilized. On the other hand, when switches 712–714 are in the off-state, the gate voltage of output transistor 708 is held by the hold capacitor 715 and voltage Vreg is supplied. In a general watch driven by a battery, for example, the source voltage is set to 1.58 V and the output voltage Vreg is set to approximately 0.8 V.

[1-3. Operation of First Embodiment]

Figure 7:
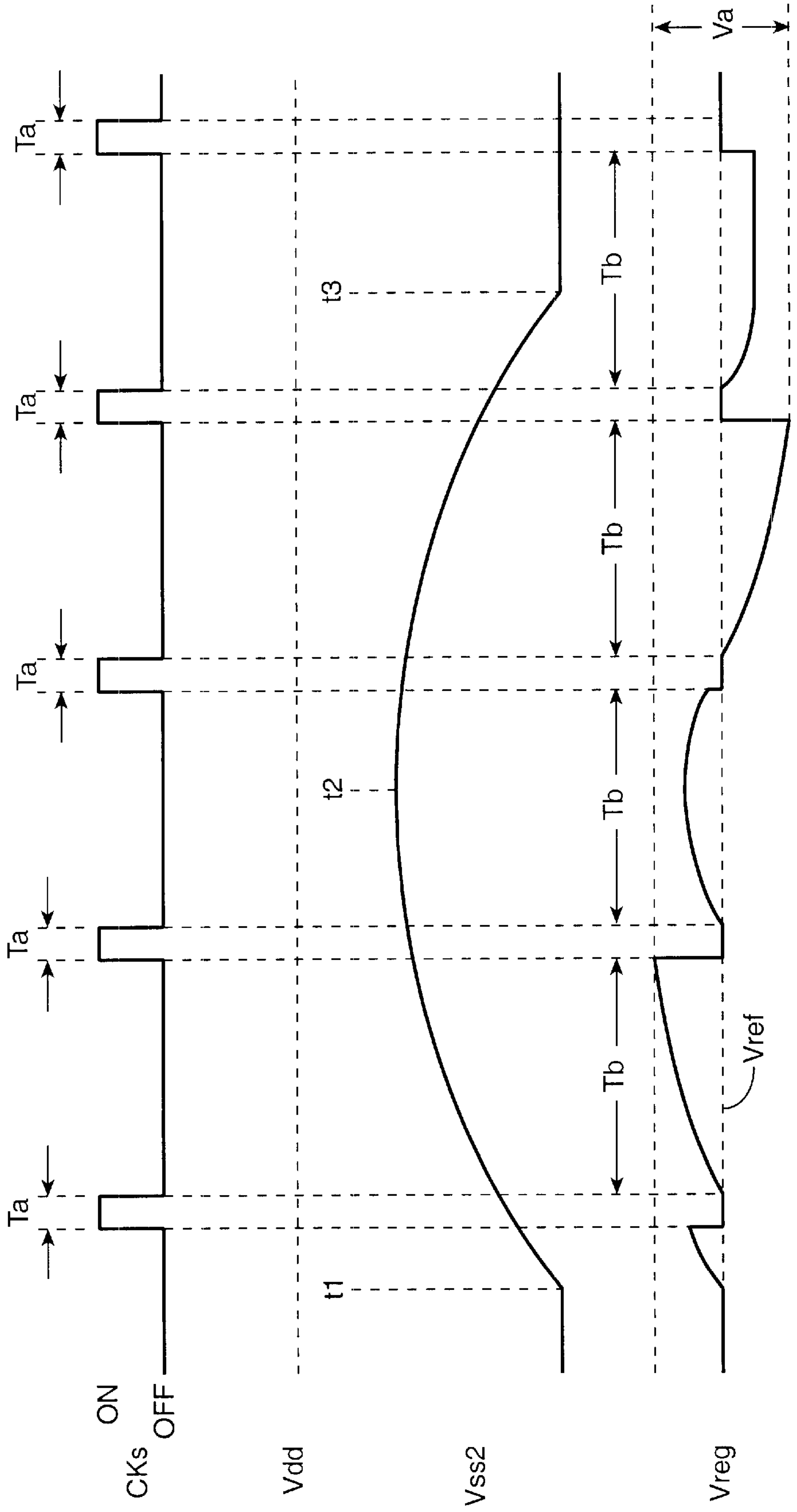
FIG. 7 is a timing chart for explaining the operation of the timepiece according to the embodiment shown in FIG. 1.

The operation of the first embodiment will be next described with reference to the drawing. FIG. 7 is a timing chart for explaining the operation of the timepiece 1.

It is assumed in this embodiment that the second lower potential side voltage Vss2 rises toward the higher potential side from the time t1, reverses from rising to falling at the time t2, and then returns, at the time t3, to the same level as at the time t1. Such a change is attributable to that, corresponding to a charging and discharging cycle of capacitor 60, the terminal voltage of the capacitor 60 decreases from the time t1, reverses from decrease to increase at the time t2, and then returns, at the time t3, to the same level as at the time t1.

First, during the period in which the sampling clock CKs takes an "H" level, switches 712–714 shown in FIG. 6 are turned on and the above-mentioned feedback loop is formed. Therefore, a decrease in value of the voltage Vreg lowers the gate voltage of input transistor 702 and makes the current flowing through input transistor 701 relatively smaller than that flowing through the input transistor 702. Correspondingly, the drain voltage of the input transistor 701 is raised and the current flowing through output transistor 708 is reduced. As a result, the value of the voltage Vreg is increased. Conversely, an increase in value of the voltage Vreg raises the gate voltage of input transistor 702 and makes the current flowing through input transistor 701 relatively larger than that flowing through input transistor 702. Correspondingly, the drain voltage of input transistor 701 is lowered and the current flowing through output transistor 708 is increased. As a result, the value of the voltage Vreg is decreased. Thus, during the period in which the sampling clock CKs takes an "H" level, the voltage Vreg can be controlled so as to coincide with a preset reference voltage Vref.

On the other hand, during the period in which the sampling clock CKs takes an "L" level, switches 712–714 are turned off. Accordingly, stabilization of the voltage Vreg by the active elements is not performed, and hold capacitor 715 holds the gate voltage of output transistor 708 for driving oscillation circuit 80 and frequency dividing circuit 90. In this case, fluctuations in the second lower potential side voltage Vss2 are reflected on the voltage Vreg. However, the voltage Vreg is stabilized at the cycle of the sampling clock CKs. Specifically, as shown in FIG. 7, the voltage Vreg is fluctuated under an influence of the lower potential side voltage Vss2 in a period Tb, but it is controlled so as to coincide with the reference voltage Vref in each period Ta. Hence, a fluctuation width Va of the voltage Vreg can be suppressed to such an extent as enabling oscillation circuit 80 and frequency dividing circuit 90 to be operated satisfactorily.

With the first embodiment, as described above, since power is intermittently supplied to constant-voltage circuit 70, power consumption of constant-voltage circuit 70 can be much reduced. As a result, it is possible to reduce total power consumption of timepiece 1 and to greatly prolong a period of time during which timepiece 1 can be continuously used.

[1-4. Modifications of First Embodiment]

Figure 8:
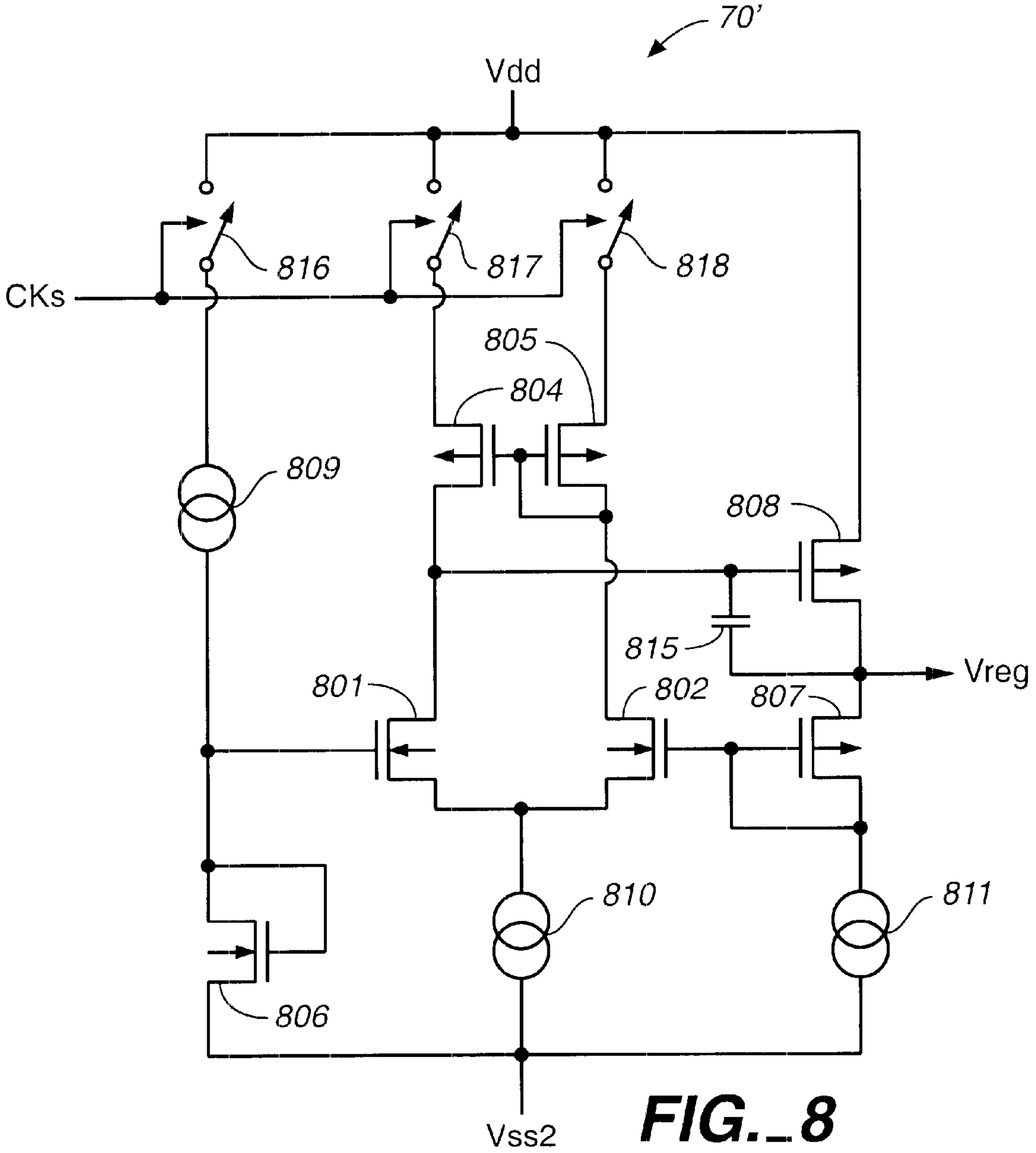
FIG. 8 is a circuit diagram showing one example of a constant-voltage circuit according to a modification of the embodiment shown in FIG. 1.

Constant-voltage circuit 70 may be modified as shown in FIG. 8. A modified constant-voltage circuit 70' differs in circuit configuration from constant-voltage circuit 70 shown in FIG. 6 as follows. The elements connected to the higher potential side voltage Vdd and the elements connected to the lower potential side voltage Vss are reversed in arrangement. The P-channel transistors and the N-channel transistors are replaced with each other. Further, the lower potential side voltage Vss2 is set to the reference potential.

Figure 9:
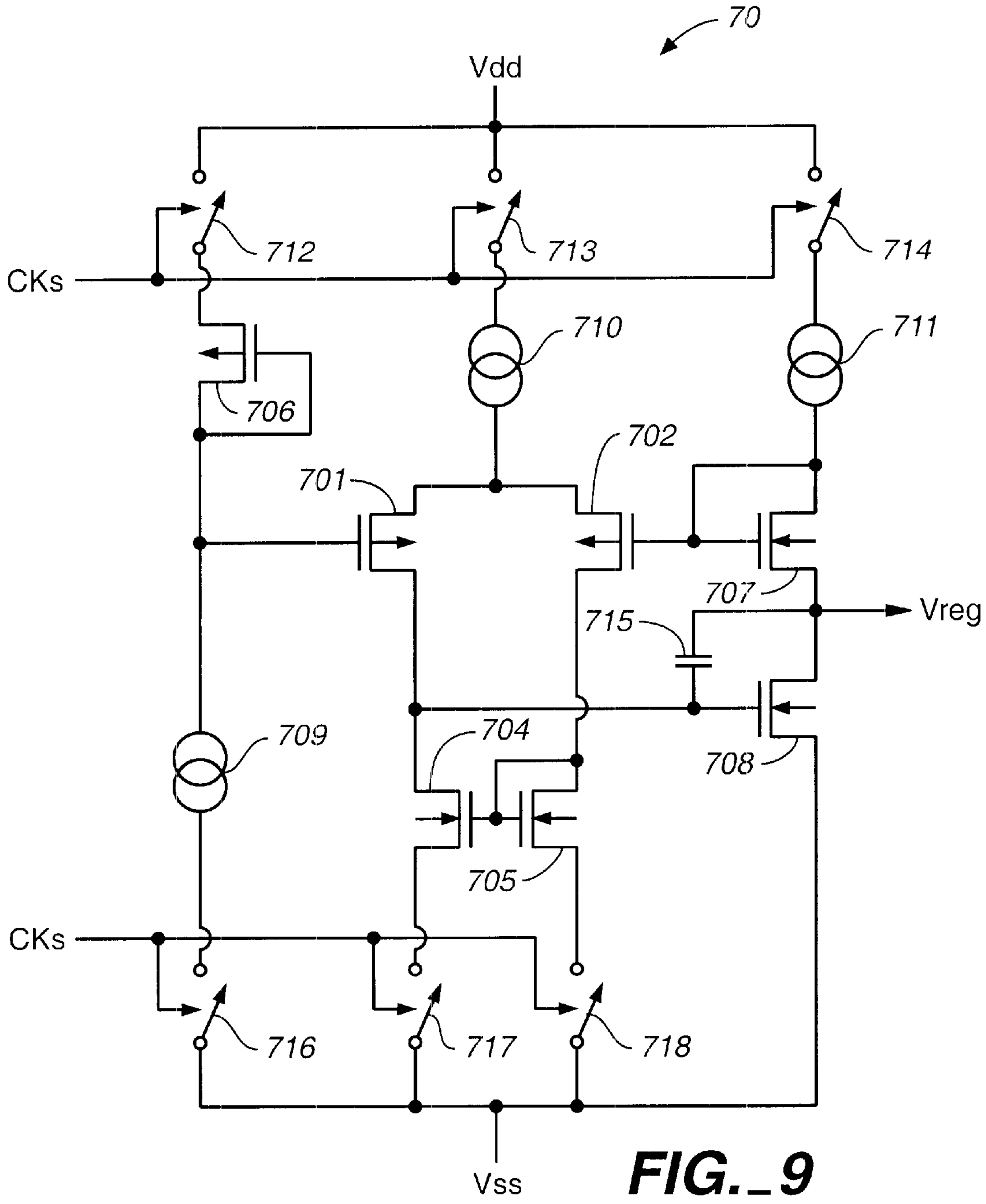
FIG. 9 is a circuit diagram showing one example of a constant-voltage circuit according to a modification of the embodiment shown in FIG. 1.
Figure 10:
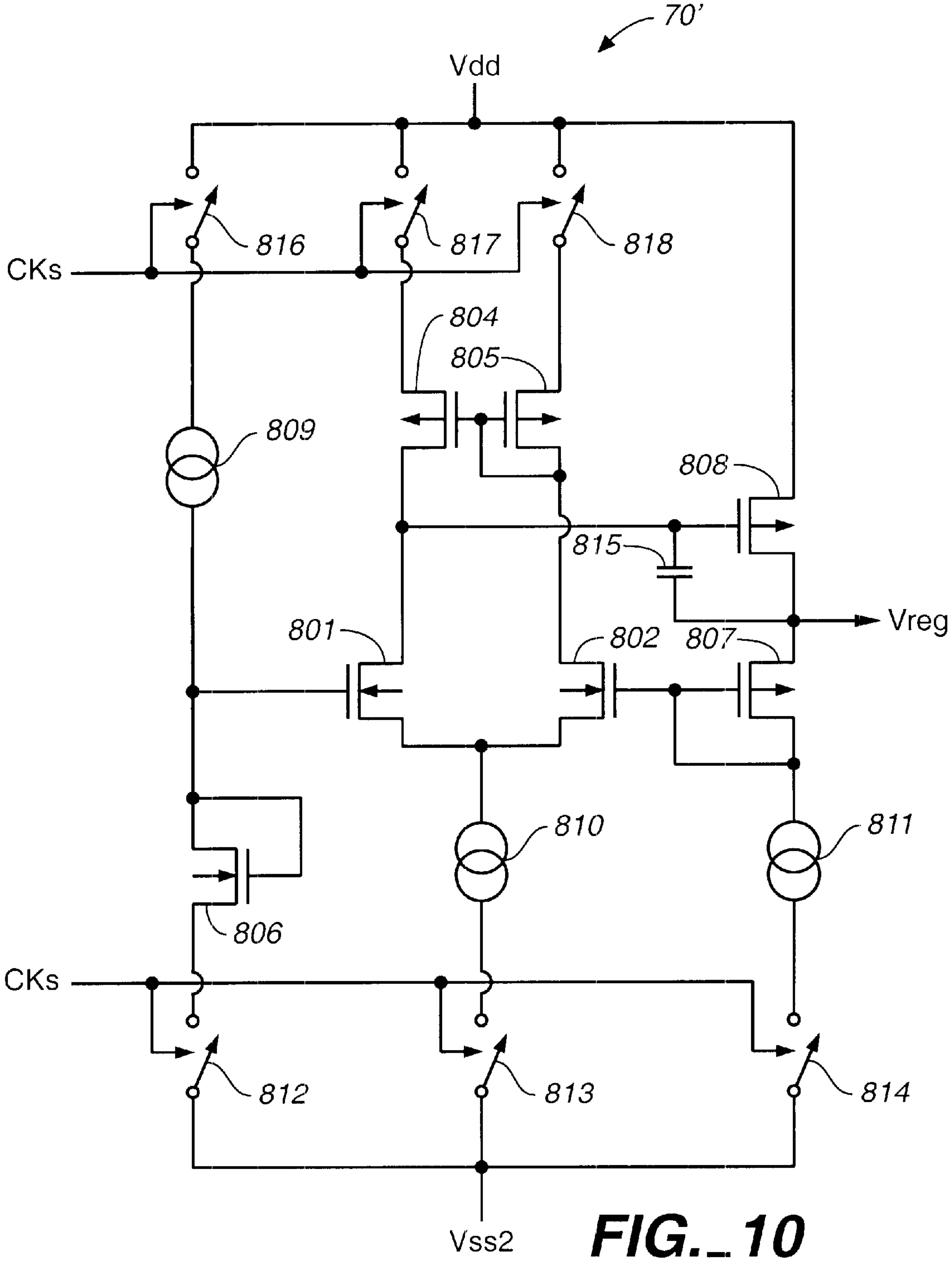
FIG. 10 is a circuit diagram showing one example of a constant-voltage circuit according to a modification of the embodiment shown in FIG. 1.

Also, in constant-voltage circuit 70, the lower potential side voltage Vss may be supplied through switches 716–718 as shown in FIG. 9. Likewise, in the constant-voltage circuit 70', the second lower potential side voltage Vss2 may be supplied through switches 812–814 as shown in FIG. 10.

2. Second Embodiment

In the above first embodiment, power consumption of constant-voltage circuit 70 is reduced by controlling supply of power to constant-voltage circuit 70 in accordance with the sampling clock CKs having always the constant duty ratio. With such a control process, even when the second lower potential side voltage Vss2 fluctuates to some extent, the fluctuation width Va of the voltage Vreg can be suppressed because constant-voltage circuit 70 executes the stabilizing operation in a cyclic manner.

However, when stepper motor 110 is rotated with driving pulses, a large current is consumed by driving circuit 100 and therefore the second lower potential side voltage Vss2 rises abruptly. Also, when AC power generator 10 is in a power generating state and a current is charged into the large-capacity capacitor 30, the second lower potential side voltage Vss2 falls abruptly due to the internal resistance of the large-capacity capacitor 30. Further, the second lower potential side voltage Vss2 falls abruptly upon an increase of the step-up/down amplification K in voltage step-up/down circuit 40, and it rises abruptly upon a decrease of the step-up/down amplification K. When the second lower potential side voltage Vss2 fluctuates abruptly in such an event, the fluctuation width Va of the voltage Vreg is so increased as to cause a fear that the oscillation frequency of oscillation circuit 80 may become unstable, or frequency dividing circuit 90 may malfunction. In the worst case, oscillation circuit 80 may stop the oscillation. By increasing a proportion of the "H" level period in one cycle of the sampling clock CKs, the fluctuation width of the voltage Vreg can be suppressed in spite of an abrupt change of the second lower potential side voltage Vss2. This solution however results in a smaller reduction rate of power consumption of constant-voltage circuit 70.

In view of the above-described situation, the second embodiment intends to suppress fluctuations in the voltage Vreg in spite of abrupt fluctuations in the second lower potential side voltage Vss2, while ensuring a large reduction rate of power consumption of constant-voltage circuit 70.

[2-1 Construction of Second Embodiment]

Figure 11:
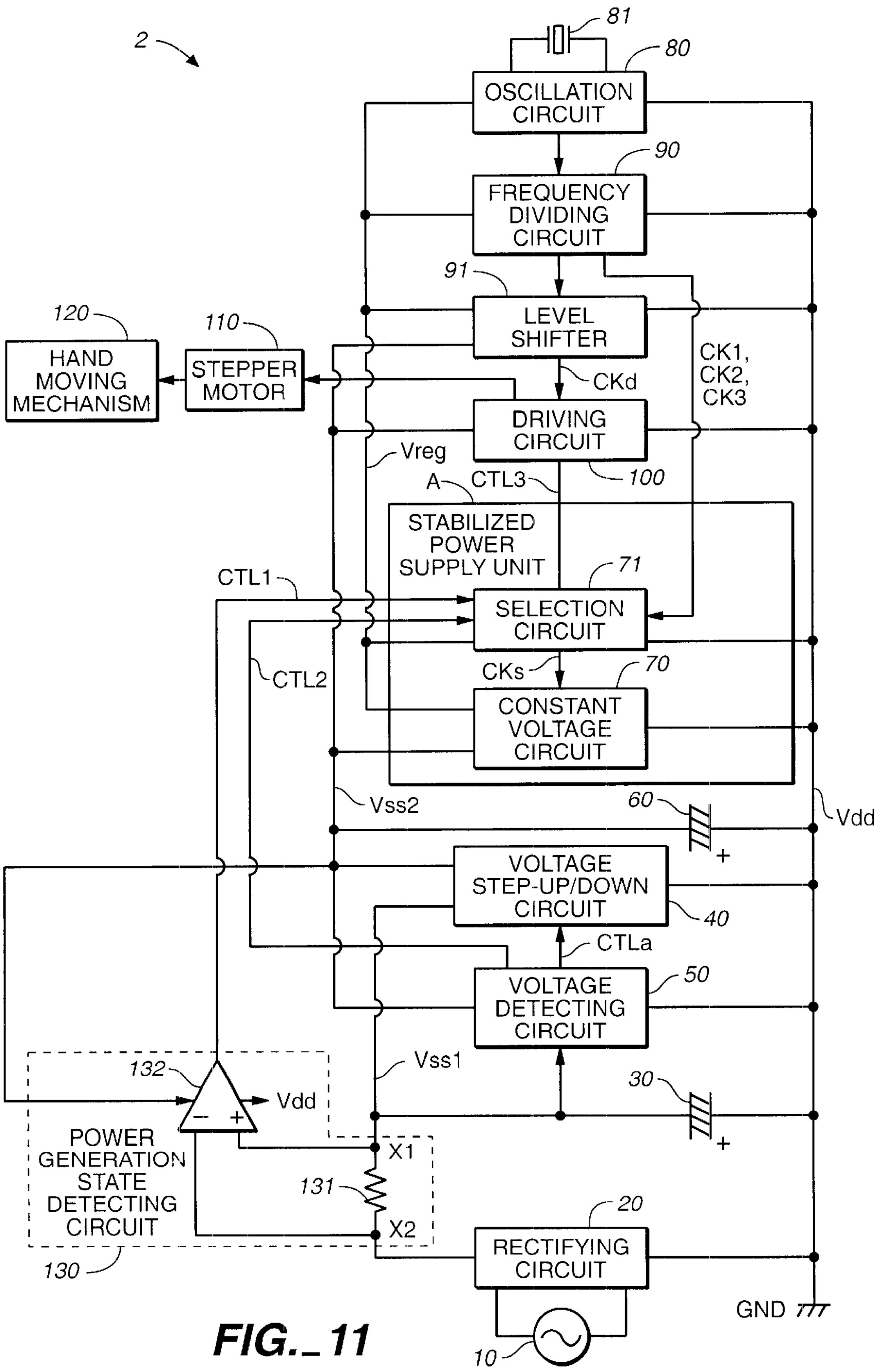
FIG. 11 is a block diagram showing a construction of a timepiece according to a second embodiment of the present invention.

FIG. 11 is a block diagram of a timepiece 2 according to the second embodiment. Timepiece 2 is basically of the same construction as the timepiece 1 in the first embodiment shown in FIG. 1 except that a stabilized power supply unit A is employed in place of the constant-voltage circuit 70 and a power generation state detecting circuit 130 for detecting a power generation state of the AC power generator 10 is newly employed.

The power generation state detecting circuit 130 detects a power generation state of AC power generator 10, thereby sensing charging into large-capacity capacitor 30. Power generation state detecting circuit 130 in this embodiment comprises, as shown, a resistance 131 and an operational amplifier 132. Operational amplifier 132 is designed with some offset to prevent malfunction due to noise.

A positive input terminal of the operational amplifier 132 is connected to one end X1 of the resistance 131 which is in turn connected to large-capacity capacitor 30. Therefore, when an electromotive voltage generates in AC power generator 10 and a charging current flows through a closed loop in the sequence of rectifying circuit 20→the higher potential side voltage Vdd→large-capacity capacitor 30→resistance 131→rectifying circuit 20, an output signal of operational amplifier 132 takes an "H" level. When no charging current flows through the closed loop, the output signal of operational amplifier 132 takes an "L" level. Then, the output signal of operational amplifier 132 is outputted as a first control signal CTL1.

When a charging current flows into large-capacity capacitor 30, the first lower potential side voltage Vss1 falls abruptly due to the internal resistance of the large-capacity capacitor 30. Because of voltage step-up/down circuit 40 stepping up or down the first lower potential side voltage Vss1 to produce the second lower potential side voltage Vss2, if the first lower potential side voltage Vss1 falls abruptly, the second lower potential side voltage Vss2 also falls abruptly in a corresponding way. Accordingly, by referring to the first control signal CTL1, it is possible to detect a period during which the second lower potential side voltage Vss2 fluctuates abruptly.

A second control signal CTL2 outputted from voltage detecting circuit 50 takes an "H" level during a period until a predetermined time lapses from the time immediately before a change in the step-up/down control signal CTLa, and takes an "L" level during the remaining period. When the step-up/down amplification K changes, the second lower potential side voltage Vss2 fluctuates abruptly, but settles within the lapse of a certain time. The time during which the second control signal CTL2 takes an "H" level is set depending on the time required for the second lower potential side voltage Vss2 to settle. Accordingly, by referring to the second control signal CTL2, it is possible to detect a period during which the second lower potential side voltage Vss2 fluctuates abruptly.

Driving circuit 100 and capacitor 60 constitute an equivalent low-pass filter with respect to the second lower potential side voltage Vss2. Therefore, when the stepper motor is driven with the driving pulses from the driving circuit 100, the second lower potential side voltage Vss2 fluctuates abruptly and then continues fluctuating for a certain period after the end of the effective period of the driving pulses. A third control signal CTL3 outputted from driving circuit 100 is produced in view of the above fact. More specifically, the third control signal CTL3 takes an "H" level during a period not just corresponding to the period during which the driving pulses are effective, but from the time immediately before the driving pulses become effective to the complete settlement of fluctuations in the second lower potential side voltage Vss2, and takes an "L" level during the remaining period. Accordingly, by referring to the third control signal CTL3, it is possible to detect a period during which the second lower potential side voltage Vss2 fluctuates abruptly.

Stabilized power supply unit A comprises a selection circuit 71 and constant-voltage circuit 70 described in the first embodiment. A first clock CK1 (duty ratio=1/8), a second clock CK2 (duty ratio=1/2), a third clock CK3 (duty ratio=3/4), and a "H" level signal H are supplied to respective signal input terminals of selection circuit 71. The first to third control signals CTL1–CTL3 are supplied to respective control input terminals of selection circuit 71. The selection circuit 71 selects one of the first to third clocks CK1–CK3 or the "H" level signal H in accordance with the first to third control signals CTL1–CTL3. Selected signal is supplied as the sampling clock CKs to the constant-voltage circuit 70.

Figures 12, 14:
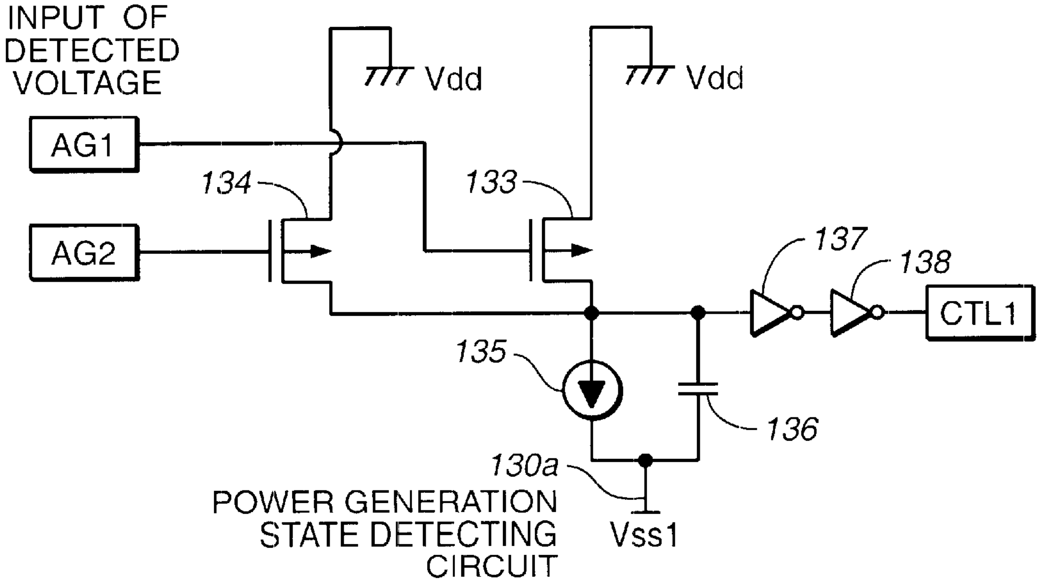
FIG. 12 is a truth table for a selection circuit in the second embodiment.
FIG. 14 is a circuit diagram showing a modification of a power generation state detecting circuit in the second embodiment.

Although the signal selection can be made in various ways, one signal is selected based on a truth table shown in FIG. 12 in this embodiment. When the first to third control signals CTL1–CTL3 all take an "L" level, the second lower potential side voltage Vss2 does not fluctuate abruptly. Accordingly, the voltage Vreg also does not fluctuate substantially even when the operation of stabilizing the voltage Vreg is cyclically performed with relatively long time intervals. In such a case, therefore, the first clock CK1, which has the minimum duty ratio R among the first to third clocks CK1–CK3, is supplied as the sampling clock CKs to the constant-voltage circuit 70. Thus, in this case, the power consumption of the constant-voltage circuit 70 can be reduced to 1/8 as with the first embodiment.

Also, when only the first control signal CTL1 takes an "H" level, the second clock CK2 is supplied as the sampling clock CKs to constant-voltage circuit 70. Thus, in this case, the second clock CK2 having a duty ratio of 1/2 is employed as the sampling clock CKs. Accordingly, even with the second lower potential side voltage Vss2 fluctuating abruptly upon a current flowing into the large-capacity capacitor 30, the stabilizing operation of constant-voltage circuit 70 is performed for a relatively long period, and hence fluctuations in the voltage Vreg are suppressed.

Further, when the second control signal CTL2 takes an "H" level and the third control signal CTL3 takes an "L" level, the third clock CK3 is supplied as the sampling clock CKs to constant-voltage circuit 70. Thus, in this case, the third clock CK3 having a duty ratio of 3/4 is employed as the sampling clock CKs. The reason why the third clock CK3 having a larger duty ratio than the second clock CK2 used in the case of the first control signal CTL1 taking an "H" level is used when the second control signal CTL2 takes an "H" level, is that the second lower potential side voltage Vss2 has a greater change rate (Vss2/time) in the latter case. In other words, the step-up/down amplification K starts changing-over at once in response to a change of the step-up/down control signal CTLa, whereas charging into the capacitor under power generation is relatively moderately performed. By varying the duty ratio R of the sampling clock CKs depending on the change rate of the second lower potential side voltage Vss2 like this embodiment, therefore, fluctuations in the voltage Vreg can be suppressed, and at the same time the power consumption of the constant-voltage circuit 70 can be reduced.

Moreover, when the third control signal CTL3 takes an "H" level, the "H" level signal H is supplied as the sampling clock CKs to the constant-voltage circuit 70. Thus, in this case, constant-voltage circuit 70 is operated at all times. This is because the second lower potential side voltage Vss2 fluctuates maximally upon driving of stepper motor 110, and because the second lower potential side voltage Vss2 fluctuates in a direction to rise during the period in which the driving pulses are effective. With a rising of the second lower potential side voltage Vss2, the source voltages for oscillation circuit 80 and frequency dividing circuit 90 are lowered, whereupon the oscillation frequency may become unstable, or the oscillation may be stopped in the worst case. In this embodiment, however, since constant-voltage circuit 70 is always operated during the period in which the driving pulses are effective, oscillation circuit 80 and frequency dividing circuit 90 can be operated with stability.

[2-2. Operation of Second Embodiment]

Figure 13:
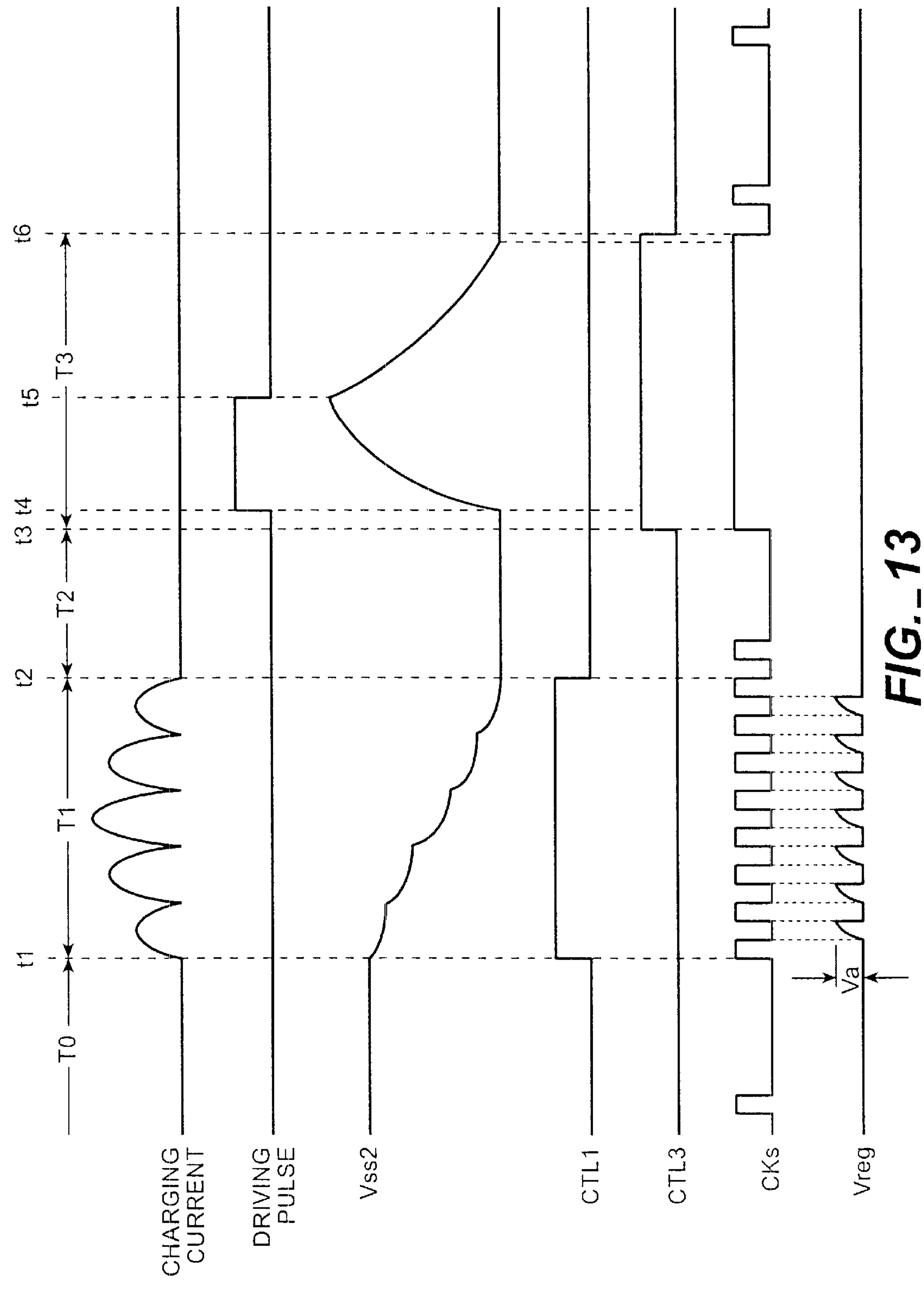
FIG. 13 is a timing chart for explaining the operation of the timepiece according to the second embodiment.

The operation of the second embodiment will be next described. FIG. 13 is a timing chart for explaining the operation of timepiece 2. It is assumed in this embodiment that the step-up/down amplification K is not changed and the second control signal CTL2 is always kept at an "L" level.

As shown in FIG. 13, supposing that the first to third control signals CTL1–CTL3 all take an "L" level during a period TO before the time t1, selection circuit 71 supplies, as the sampling clock CKs, the first clock CK1 having a duty ratio of 1/8 to the constant-voltage circuit 70. During the period T0, the second lower potential side voltage Vss2 does not fluctuate abruptly, and therefore the voltage Vreg also does not fluctuates substantially. Accordingly, even with power supply to constant-voltage circuit 70 restricted to 1/8, oscillation circuit 80 and frequency dividing circuit 90 are operated with stability.

Then, when a charging current flows during a period T1 from the time t1 to t2, the second lower potential side voltage Vss2 lowers gradually during the period T1. Upon flowing of the charging current, power generation state detecting circuit 130 detects such a phenomenon and supplies the first control signal CTL1 having an "H" level to selection circuit 71 during the period T1. Correspondingly, selection circuit 71 supplies, as the sampling clock CKs, the second clock CK2 having a duty ratio of 1/2 to the constant-voltage circuit 70. In this case, the second lower potential side voltage Vss2 fluctuates abruptly, but the sampling clock CKs has a duty ratio of 1/2 and therefore the fluctuation width Va of the voltage Vreg can be reduced. Accordingly, even with the second lower potential side voltage Vss2 fluctuating abruptly, the fluctuation in the voltage Vreg can be so suppressed that the oscillation circuit 80 and the frequency dividing circuit 90 are operated with stability.

Then, during a period T2 from the time t2 to t3, since the first to third control signals CTL1–CTL3 all take an "L" level, the constant-voltage circuit 70 is operated with its power consumption restricted to 1/8 in the same manner as during the period T0.

Then, supposing that the driving pulse takes an "H" level during a period from the time t4 to t5, the third control signal CTL3 has an "H" level during a period T3 from the time t3 before t4 to the time t6. Therefore, selection circuit 71 supplies, as the sampling clock CKs, to the constant-voltage circuit 70. In this case, since constant-voltage circuit 70 is always operated, the voltage Vreg can be held at the constant reference voltage Vref even with the second lower potential side voltage Vss2 fluctuating abruptly. Accordingly, oscillation circuit 80 and frequency dividing circuit 90 can be operated with stability.

With the second embodiment, as described above, a condition in which the second lower potential side voltage Vss2, i.e., the input voltage of constant-voltage circuit 70, fluctuates abruptly is detected, and in such a condition, power supply to constant-voltage circuit 70 is controlled depending on fluctuations in the second lower potential side voltage Vss2. Therefore, even with the second lower potential side voltage Vss2 fluctuating abruptly, the fluctuation width Va of the voltage Vreg can be reduced. In addition, since the power supply is stopped in a longer period when the second lower potential side voltage Vss2 is stable, the power consumption of constant-voltage circuit 70 can be much reduced.

[2-3. Modifications of Second Embodiment]

(1) It is a matter of course that, in timepiece 2 according to the second embodiment, constant-voltage circuit 70 may be modified as shown in FIGS. 8, 9 and 10.

(2) In timepiece 2 according to the second embodiment, the power generation state of AC power generator 10 is detected in accordance with the charging current flowing into the large-capacity capacitor 30. However, the present invention is not limited to the second embodiment, and power generation state of the AC power generator 10 may be detected in accordance with the charging current flowing into capacitor 60. As an alternative, the power generation state of AC power generator 10 may be detected in accordance with the electromotive voltage of AC power generator 10. In this case, the electromotive voltage of AC power generator 10 is compared with a preset reference voltage, and the power generation state is detected in accordance with a comparison result.

A modification of power generation state detecting circuit 130 shown in FIG. 2, which is adapted for the case of detecting the power generation state in accordance with a result from comparison with the electromotive voltage of AC power generator 10. A power generation state detecting circuit 130*a* shown in FIG. 14 comprises two P-channel transistors 133, 134, a constant-current circuit 135 having current lead-in side terminals connected to drain terminals of P-channel transistors 133, 134, a capacitor 136 connected to constant-current circuit 135 in parallel, an inverter 137 having an input terminal connected to the drain terminals of P-channel transistors 133, 134, and an inverter 138 connected in series to inverter 137. The terminal voltages at both ends of power generation coil 244 shown in FIG. 2 are applied to gate terminals AG1, AG2 of P-channel transistors 133, 134, and the voltage Vdd is applied to each source terminal thereof. The voltage Vss1 or the voltage Vss2 is applied to the other terminals of constant-current circuit 135 and capacitor 136. An output signal of inverter 138 serves as the first control signal CTL1.

In the above arrangement, when AC power generator 10 generates an electromotive voltage, P-channel transistors 133, 134 are turned on alternately to produce a voltage between both terminals of capacitor 136. Therefore, an input to inverter 137 takes an "L" level, whereupon the control signal CTL1 outputted from inverter 138 takes an "H" level. On the other hand, when AC power generator 10 generates no electromotive voltage, P-channel transistors 133, 134 remain turned off and charges in capacitor 136 are discharged through constant-current circuit 135. Therefore, the voltage between both the terminals of capacitor 136 is reduced and an input to inverter 137 takes an "H" level, whereupon the control signal CTL1 outputted from inverter 138 takes an "L" level.

(3) In timepiece 2 according to the second embodiment, a condition in which the second lower potential side voltage Vss2 fluctuates abruptly is detected in accordance with the power generation state of AC power generator 10, a change of the step-up/down amplification K in voltage step-up/down circuit 40, and driving of stepper motor 110. However, the present invention is not limited to the second embodiment, and a condition in which the second lower potential side voltage Vss2 fluctuates abruptly may be detected in accordance with a proper combination of those factors.

Further, factors causing the second lower potential side voltage Vss2 to fluctuate abruptly are not limited to those described above. For example, when a timepiece includes a calendar indicating mechanism comprising a wheel train and a date indicator, and the calendar indicating mechanism is driven by another motor separate from the stepper motor 110, driving pulses for driving the other motor may be considered as one of the above factors.

As additional factors causing the second lower potential side voltage Vss2 to fluctuate abruptly, there may be a driving current for an alarm unit (such as a buzzer or a voice synthesis device for generating a voice signal) in the case of providing the alarm unit in a timepiece, an illumination light-up current in the case of providing an illumination unit, etc. In such a case, the constant-voltage circuit may be controlled using a driving control signal for the alarm unit or a control signal for an illumination lamp.

Fluctuations in the second lower potential side voltage Vss2 may be directly detected. In this case, by way of example, a change rate of the second lower potential side voltage Vss2 is detected by a differential circuit made up of a capacitor and a resistance, and a detected value is compared with a preset threshold. In accordance with a comparison result, any one of the first to third clocks CK1–CK3 and the "H" level signal H is selected and employed as the sampling clock CKs.

Moreover, it is possible that the width of driving pulses generated by driving circuit 100 for driving stepper motor 110 is selected from among several values depending on the load, and any one of the first to third clocks CK1–CK3 and the "H" level signal H is selected depending on the selected pulse width and is employed as the sampling clock CKs. More specifically, by way of example, when stepper motor 110 cannot be rotated with usual driving pulses, driving pulses having a larger width is generated (at a lower frequency) and the "H" level signal H is selected in this case, causing constant-voltage circuit 70 to operate at all times. On other hand, when the usual driving pulses are generated, one of the first to third clocks CK1–CK3 is selected, as required, to operate the constant-voltage circuit 70 in a sampling manner.

In a watch capable of operating in two modes, i.e., a time indicating mode in which hand moving mechanism 120 is operated and a power saving mode in which the operation of hand moving mechanism 120 is stopped to reduce power consumption, the duty ratio of the sampling clock CKs may be set to a smaller value of 1/16 in the power saving mode because power consumption is not so large and the source voltage does not fluctuate in that mode. On the other hand, in the time indicating mode, any one of the first to third clocks CK1–CK3 and the "H" level signal H may be selected as the sampling clock CKs.

So long as a condition in which the second lower potential side voltage Vss2 fluctuates abruptly can be detected, the timepiece can be modified in any suitable ways.

Additionally, in the second embodiment, any one of the first to third clocks CK1–CK3 and the "H" level signal H is selected and employed as the sampling clock CKs. However, the duty ratio R of the sampling clock CKs except for the "H" level signal H may be varied.

3. Modifications of Present Invention (1) While each of the above embodiments employs AC power generator 10 of the type converting a rotary motion of a rotating weight to electrical energy, the present invention is not limited to the use of such a power generator. The present invention may also use, for example, a power generator wherein a rotary motion is produced by a restoring force of a spring and an electromotive force is generate with the rotary motion, or a power generator wherein an external or self-excited vibration or displacement is applied to a piezoelectric body and power is produced with the piezoelectric effect. Further, power generation using solar cells, and thermal power generation are also usable.

A primary storage battery or a secondary storage battery may be used instead of AC power generator 10 and rectifying circuit 20. When a primary or secondary storage battery is used, it is not required to detect the power generation state.

(2) While each of the above embodiments has been described in connection with, by way of example, a timepiece in the form of a wrist watch, the present invention is not limited to the wrist watch, but is also applicable to a pocket clock or the like. Further, the present invention is adaptable for portable electronic equipment such as pocket-size calculators, cellular phones, portable personal computers, electronic notepads, portable radios, and portable VTRs.

(3) While in each of the above embodiments the reference potential (GND) is set to Vdd (higher potential side), the reference potential (GND) may be of course set to Vss (lower potential side).

(4) While each of the above embodiments has been described on the premise of employing voltage step-up/down circuit 40, it is a matter of course that a voltage step-up circuit for carrying out only the step-up operation may be used instead of the voltage step-up/down circuit 40.

Also, when AC power generator 10 generates a large electromotive voltage, voltage step-up/down circuit 40, voltage detecting circuit 50, and capacitor 60 may be omitted, and both the terminals of large-capacity capacitor 30 may directly connected to constant-voltage circuit 70.

[Advantages]

According to the features of the present invention, as described above, since voltage stabilizing means is intermittently operated, power consumption of a power supply device can be reduced. Further, since power supply to the voltage stabilizing means is controlled in accordance with fluctuations in an input voltage, a fluctuation width of an output voltage can be suppressed, and at the same time the power consumption of the power supply device can be reduced.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

Reference Numerals

1, 2 . . . timepiece
10 . . . AC power generator (power generating means)
30 . . . large-capacity capacitor (first electricity accumulating means)
40 . . . voltage step-up/down circuit (voltage transforming means)
50 . . . voltage detecting circuit (voltage fluctuation detecting means, amplification change detecting means)
60 . . . capacitor (second electricity accumulating means)
70 . . . constant-voltage circuit (voltage stabilizing means)
71 . . . selection circuit (control means)
80 . . . oscillation circuit (processing means, clocking means)
90 . . . frequency dividing circuit (processing means, clocking means)
100 . . . driving circuit (voltage fluctuation detecting means)
110 . . . stepper motor (power consuming means, motor)
130, 130*a* . . . power generation state detecting means (voltage fluctuation detecting means, charging detecting means)
712–714 . . . switch (power supply means)
vdd . . . higher potential side voltage
mVss1 . . . first lower potential side voltage
Vss2 . . . second lower potential side voltage

What is claimed is:

1. A power supply device comprising:

power supply line for supplying power;

voltage stabilizing means selectively coupled to said power supply line, and effective for producing a stabilized output voltage by stabilizing an input voltage when coupled to said power supply line;

voltage fluctuation detecting means for detecting a non-stable condition in which a fluctuation of predefined magnitude or frequency in said input voltage is detected or a predefined condition, for which a fluctuation in said input voltage is expected, is detected; and control means for selectively coupling and decoupling said power supply line from said voltage stabilizing means in accordance with a detection result of said voltage fluctuation detecting means, wherein when said non-stable condition is not detected, said control means repeatedly alternates between a first predetermined time period during which said power supply line is coupled to said voltage stabilizing means and a second predetermined time period during which said power supply line is not coupled to said voltage stabilizing means, the ratio of said first time period to said second time period being defined as a first ratio, and wherein said control means increases said first ratio in response to said voltage fluctuation detecting means detecting said non-stable condition.

2. A power supply device according to claim 1, wherein said control means controls the coupling of said power supply line to said voltage stabilizing means so as to intermittently supply power to said voltage stabilizing means when said non-stable condition is not detected, and wherein said control means increases said first ratio to the point where said power supply line is continuously coupled to said voltage stabilizing means in response to detection of said non-stable condition.

3. A portable electronic device comprising:

power generating means for generating power;

electricity accumulating means for accumulating the power from said power generating means; and a power supply device including:

a) power transfer means for transferring power onto a power rail, said power transfer means being coupled to receive the accumulated power from said electricity accumulating means;

b) voltage stabilizing means for producing a stabilized output voltage at an output node by stabilizing an input voltage when coupled to said power rail, and for permitting said output node to follow voltage fluctuations in said input voltage when not coupled to said power rail;

c) voltage fluctuation detecting means for detecting a non-stable condition in which a fluctuation of predefined magnitude or frequency in said input voltage is detected or a predetermined condition is detected in which a fluctuation in said input voltage is expected, wherein said voltage fluctuation detecting means includes a power generation detection circuit for detecting the transfer of power from said power generating means to said electricity accumulating means; and d) control means for selectively coupling and decoupling said power rail from said voltage stabilizing means in accordance with a detection result of said voltage fluctuation detecting means.

4. A portable electronic device according to claim 3, wherein said power generation detection circuit detects the transfer of power to said electricity accumulating means by monitoring a current flow between said power generating means and said electricity accumulating means.

5. A portable electronic device according to claim 3, wherein said power generation detection circuit detects the transfer of power to said electricity accumulating means by monitoring an electromotive voltage generated by said power generating means.

6. A portable electronic device comprising:

power generating means for generating power;

first electricity accumulating means for accumulating power from said power generating means;

voltage multiplying means for multiplying a voltage of said first electricity accumulating means with a multiplying amplification value dependent on the magnitude of the voltage of said first electricity accumulating means;

second electricity accumulating means for storing the voltage multiplied by said voltage multiplying means; and a power supply device including:

a) a power rail for supplying power, said power rail being coupled to receive the stored voltage from said second electricity accumulating means;

b) voltage stabilizing means for producing a stabilized output voltage at an output node by stabilizing an input voltage when coupled to said power rail, and for permitting said output node to follow voltage fluctuations from said input voltage when not coupled to said power rail;

c) voltage fluctuation detecting means for detecting a non-stable condition in which a fluctuation of predefined magnitude or frequency in the input voltage is detected or a predefined condition, for which a fluctuation in the input voltage is expected, is detected, wherein said voltage fluctuation detecting means includes amplification change detecting means for detecting a change in the multiplication amplification value of said voltage multiplying means; and control means for selectively coupling and decoupling said power rail from said voltage stabilizing means in accordance with a detection result of said voltage fluctuation detecting means.

7. A portable electronic device comprising:

a) a power supply device including:

power transfer means for transferring power onto a power rail;

voltage stabilizing means for producing a stabilized output voltage at an output node by stabilizing an input voltage when coupled to said power rail, and for permitting said output node to follow voltage fluctuations in said input voltage when not coupled to said power rail;

voltage fluctuation detecting means for detecting a non-stable condition in which a fluctuation of predefined magnitude or frequency in said input voltage is detected or a predefined condition, for which a fluctuation in said input voltage is expected, is detected; and control means for selectively coupling and decoupling said power rail from said voltage stabilizing means in accordance with a detection result of said voltage fluctuation detecting means; and b) power consuming means coupled to receive said input voltage and consume power from said input voltage;

wherein said voltage fluctuation detecting means includes power consumption detecting means for detecting an increase of power consumption in said power consuming means.

8. A portable electronic device according to claim 7, wherein said power consuming means includes a motor, and said power consumption detecting means detects an increase of power consumption in by monitoring a driving signal for said motor.

9. A portable electronic device according to any one of claims 3, 6 or 7, wherein when said non-stable condition is not detected, said control means repeatedly alternates between a first predetermined time period during which said power rail is coupled to said voltage stabilizing means and a second predetermined time period during which said power rail is decoupled from said voltage stabilizing means, the ratio of said first time period to said second time period being defined as a first ratio, and wherein said control means increases the said first ratio in response to said voltage fluctuation detecting means detecting said non-stable condition.

10. A portable electronic device according to claim 9, wherein said control means responds to said voltage fluctuation detecting means detecting said non-stable condition by increasing said first ratio for a certain preset time period.

11. A portable electronic device according to any one of claims 3, 6 and 7, wherein said control means intermittently couples said power rail to said voltage stabilizing means when said non-stable condition is not detected, and wherein said control means continuously couples said power rail to said voltage stabilizing means when said voltage fluctuation detecting means detects said non-stable condition.

12. A portable electronic device according to claim 11, wherein said control means continuously couples said power rail to said voltage stabilizing means for a certain preset period when said voltage fluctuation detecting means detects said non-stable condition.

13. A timepiece comprising:

a power supply device including:

power transfer means for transferring power onto a power rail;

voltage stabilizing means for producing a stabilized output voltage at an output node by stabilizing an input voltage when coupled to said power rail and for permitting said output node to follow voltage fluctuations in said input voltage when not coupled to said power rail;

voltage fluctuation detecting means for detecting a non-stable condition in which a fluctuation of predetermined magnitude or frequency in said input voltage is detected or a predefined condition, for which a fluctuation in said input voltage is expected, is detected;

control means for selectively coupling and decoupling said power rail from said voltage stabilizing means in accordance with a detection result of said voltage fluctuation detecting means; and clocking means supplied with power from said power rail for counting time.

14. A timepiece comprising:

power generating means for generating power;

electricity accumulating means for accumulating the power from said power generating means;

a power supply device including:

a) power transfer means for transferring power onto a power rail, said power transfer means being coupled to receive the accumulated power from said electricity accumulating means;

b) voltage stabilizing means for producing a stabilized output voltage at an output node by stabilizing an input voltage when coupled to said power rail, and for permitting said output node to follow voltage fluctuations in said input voltage when not coupled to said power rail;

c) voltage fluctuation detecting means for detecting a non-stable condition in which a fluctuation of predefined magnitude or frequency in said input voltage is detected or a predetermined condition is detected in which a fluctuation in said input voltage is expected, and control means for selectively coupling and decoupling said power rail from said voltage stabilizing means in accordance with a detection result of said voltage fluctuation detecting means; and clocking means supplied with power from said voltage stabilizing means and effective for counting time.

15. A timepiece comprising:

power generating means for generating power;

first electricity accumulating means for accumulating the power from said power generating means;

voltage multiplying means for multiplying a voltage of said first electricity accumulating means with a multiplying amplification value dependent on the magnitude of the voltage of said first electricity accumulating means;

second electricity accumulating means for accumulating the voltage multiplied by said voltage multiplying means;

a power supply device including:

a) power transfer means for transferring power onto a power rail, said power transfer means being coupled to receive the accumulated voltage from said second electricity accumulating means;

b) voltage stabilizing means for producing a stabilized output voltage at an output node by stabilizing an input voltage when coupled to said power rail and for permitting said output node to follow voltage fluctuations in said input voltage when not coupled to said power rail;

c) voltage fluctuation detecting means for detecting a non-stable condition in which a fluctuation of predetermined magnitude or frequency in said input voltage is detected or a predetermined condition is detected in which a fluctuation in the input voltage is expected;

amplification change detecting means for detecting a change in the multiplying amplification value of said voltage multiplying means;

control means for selectively coupling and decoupling said power rail from said voltage stabilizing means in accordance with a result detected by said amplification change detecting means; and clocking means supplied with power from said voltage stabilizing means and effective for counting time.

16. A control method for a power supply device including a power rail and a constant-voltage circuit for producing a stabilized output voltage at an output node by stabilizing an input voltage when coupled to said power rail and for permitting said output node to follow voltage fluctuations in said input voltage when not coupled to said power rail, said control method comprising the steps of:

(a) coupling said constant-voltage circuit to said power rail for a first preset time;

(b) decoupling said constant-voltage circuit from said power rail for a second preset time after the lapse of said first preset time; and (c) repeating step (a) and step (b) subsequent to the end of step (b).

17. A control method for a power supply device including a power rail and a constant-voltage circuit for producing a stabilized output voltage at an output node by stabilizing an input voltage when coupled to said power rail and for permitting said output node to follow voltage fluctuations in said input voltage when not coupled to said power rail, said control method comprising the steps of:

a monitoring step for detecting a non-stable condition in which a fluctuation of predetermined magnitude or frequency in said input voltage is detected or a predetermined condition is detected in which a fluctuation on said input voltage is expected; and a controlling step for selectively coupling and decoupling said power rail from said constant-voltage circuit in accordance with a results of said monitoring step.

18. A control method for a timepiece including a power rail, a constant-voltage circuit for producing a stabilized output voltage at an output node by stabilizing an input voltage when coupled to said power rail and for permitting said output node to follow voltage fluctuations in said input voltage when not coupled to said power rail, and a clocking circuit supplied with power from said constant-voltage circuit and effective for counting time, said control method comprising the steps of:

accumulating in a first electricity accumulator power transferred from a power generator;

multiplying a voltage of said first electricity accumulator at a multiplying amplification value dependent on the magnitude of the voltage of said first electricity accumulator;

accumulating the multiplied voltage in a second electricity accumulator and supplying, as said input voltage, the accumulated voltage of said second electricity accumulator to said constant-voltage circuit;

transferring power from said second electricity accumulator to a driving a motor to rotate hands for indicating the time of day in accordance with a result counted by said clocking circuit;

detecting at least one of an event of transferring power to said first electricity accumulator, an event of changing said multiplying amplification value, and an event of transferring power to said driving motor; and controlling the coupling and decoupling of said power rail to said constant-voltage circuit in accordance with the detected event in said detecting step.

19. A control method for a timepiece according to claim 18, further comprising the steps of:

intermittently coupling said power rail to said constant-voltage circuit for a first predetermined time and decoupling said power rail from said constant-voltage circuit for a second predetermined time when fluctuation in said input voltage is not greater than a predetermined magnitude or frequency, wherein a first ratio is defined as a ratio of said first time to said second time, and increasing said first ratio, or continuously supplying power to the constant-voltage circuit at all times, upon the detection of one of said event of transferring power to said first electricity accumulator, event of changing said multiplying amplification value, or event of transferring power to said driving motor.

20. A power providing device comprising:

a power supply to supply power;

a voltage stabilizer circuit to produce a stabilized output voltage at an output node by stabilizing an input voltage when supplied with power from said power supply and for permitting said output node to follow voltage fluctuations in said input voltage when not supplied with power from said power supply;

a voltage fluctuation detector to detect a non-stable condition in which a fluctuation of predetermined magnitude or frequency in said input voltage is detected or a predetermined condition is detected in which a fluctuation in said input voltage is expected, and a controller to control the supply of power from said power supply to said voltage stabilizer circuit in accordance with a detection result of said voltage fluctuation detector.

21. A power providing device according to claim 20, wherein when said non-stable condition is not detected, said controller modulates the supply of power from said power supply to said voltage stabilizer circuit by repeatedly alternating between a first predetermined time period during which power is supplied to said voltage stabilizer circuit and a second predetermined time period during which power is not supplied to said voltage stabilizer circuit, the ratio of said first time period to said second time period being defined as a first ratio, and wherein said controller increases said first ratio in response to detection of said non-stable condition.

22. A power providing device according to claim 20, wherein said controller controls said power supply so as to intermittently supply power to said voltage stabilizer circuit when said non-stable condition is not detected, and wherein said controller controls said power supply so as to continuously supply power to said voltage stabilizer circuit when said non-stable condition is detected.

23. A portable electronic device comprising:

a power generator to generate power;

an electricity accumulator to accumulate the power from said power generator;

a power supply device including:

a power transfer circuit to transfer power onto a power rail, said power transfer circuit being coupled to receive the accumulated power from said electricity accumulator;

a voltage stabilizer circuit to produce a stabilized output voltage at an output node by stabilizing an input voltage when coupled to said power rail, and for permitting said output node to follow voltage fluctuations in said input voltage when not coupled to said power rail;

a voltage fluctuation detector to detect a non-stable condition in which a fluctuation of predefined magnitude or frequency in the input voltage is detected or one of a plurality of predetermined conditions is detected in which a fluctuation in the input voltage is expected, and a controller to selectively couple and decouple said power rail to said voltage stabilizer circuit in accordance with a detection result of said voltage fluctuation detector;

wherein said plurality of predetermined conditions includes a power-charging condition defined as the charging of power into said electricity accumulator from said power generator, and said voltage fluctuation detector includes a charging detector to detect said power-charging condition.

24. A portable electronic device according to claim 23, wherein said electricity accumulator includes a capacitive device.

25. A portable electronic device according to claim 23, wherein said charging detector detects said power-charging condition by monitoring a charging current flowing into said electricity accumulator.

26. A portable electronic device according to claim 23, wherein said charging detector detects said power-charging condition by monitoring by monitoring an electromotive voltage generated by said power generator.

27. A portable electronic device comprising:

a power generator to generate power;

a first electricity accumulator to accumulate the power from said power generator;

a voltage multiplier to multiply a voltage of said first electricity accumulator with a multiplying amplification value dependent on the magnitude of the voltage of said first electricity accumulator;

a second electricity accumulator to accumulate the voltage multiplied by said voltage multiplier;

a power supply device including:

a power rail to supply power, said power rail being coupled to receive the accumulated voltage from said second electricity accumulator;

a voltage stabilizer circuit to produce a stabilized output voltage at an output node by stabilizing an input voltage when coupled to said power rail, and for permitting said output node to follow voltage fluctuations from said input voltage when not coupled to said power rail;

a voltage fluctuation detector to detect a non-stable condition in which a fluctuation of predefined magnitude or frequency in the input voltage is detected or a predefined condition, for which a fluctuation in the input voltage is expected, is detected, said voltage fluctuation detector including an amplification change detector to detect a change in the multiplying amplification value of said voltage multiplier; and a controller to selectively coupling and decoupling said power rail from said voltage stabilizer circuit in accordance with a detection result of said voltage fluctuation detector.

28. A portable electronic device according to claim 27, wherein said first electricity accumulator includes a first capacitive element and wherein said second electricity accumulator includes a second capacitive element.

29. A portable electronic device comprising:

a power supply device including:

a power transfer circuit to transfer power onto a power rail;

a voltage stabilizer circuit to produce a stabilized output voltage at an output node by stabilizing an input voltage when coupled to said power rail and for permitting said output node to follow voltage fluctuations in said input voltage when not coupled to said power rail;

a voltage fluctuation detector to detect a non-stable condition in which a fluctuation of predefined magnitude or frequency in said input voltage is detected or a predefined condition, for which a fluctuation in the input voltage is expected, is detected, and a controller to selectively couple and decouple said power rail to said voltage stabilizer circuit in accordance with a detection result of said voltage fluctuation detector; and a power consumer coupled to receive said input voltage and to consume received power;

wherein said voltage fluctuation detector includes a power consumption detector to detect an increase in power consumption from said power consumer.

30. A portable electronic device according to claim 29, wherein said power consumer includes a motor, and said power consumption detector detects an increase in power consumption by monitoring a driving signal for said motor.

31. A portable electronic device according to any one of claims 23, 27 and 29, wherein when said non-stable condition is not detected, said controller repeatedly alternates between a first predetermined time period during which said voltage stabilizer circuit is coupled to said power rail and a second predetermined time period during which said voltage stabilizer circuit is decoupled from said power rail, the ratio of said first time period to said second time period being defined as a first ratio, and wherein said controller increases said first ratio in response to detection of said non-stable condition.

32. A portable electronic device according to claim 31, wherein said controller responds further responds to detection said non-stable condition by increasing for a predetermined preset period said first ratio to a greater value than when said non-stable condition is not detected.

33. A portable electronic device according to any one of claims 23, 27 and 29, wherein said controller controls intermittently couples and decouples said power rail to said voltage stabilizer circuit when said non-stable condition is not detected, and wherein said controller continuously maintains said power rail coupled to said voltage stabilizer circuit when said non-stable condition is detected.

34. A portable electronic device according to claim 33, wherein said controller continuously maintains said power rail coupled to said voltage stabilizer circuit for a predetermined period when said non-stable condition is detected.

35. A timepiece comprising:

a power supply device including:

a power transfer circuit to transfer power onto a power rail;

a voltage stabilizer circuit to produce a stabilized output voltage at an output node by stabilizing an input voltage when coupled to said power rail, and for permitting said output node to follow voltage fluctuations in said input voltage when not coupled to said power rail; and a voltage fluctuation detector to detect a non-stable condition in which a fluctuation of predefined magnitude or frequency in said input voltage is detected or a predefined condition, for which a fluctuation in the input voltage is expected, is detected;

a controller to selectively coupling and decoupling said power rail to said voltage stabilizer circuit in accordance with a detection result of said voltage fluctuation detector; and a clock supplied with power from said power supply device and effective for counting time.

36. A timepiece comprising:

a power generator to generate power;

an electricity accumulator to accumulate the power from said power generator;

a power supply device including:

a power transfer circuit to transfer power onto a power rail, said power transfer circuit being coupled to receive the accumulated power from said electricity accumulator;

a voltage stabilizer circuit to produce a stabilized output voltage at an output node by stabilizing an input voltage when coupled to said power rail, and for permitting said output node to follow voltage fluctuations from said input voltage when not coupled to said power rail; and a voltage fluctuation detector to detect a non-stable condition in which a fluctuation of predefined magnitude or frequency in the input voltage is detected or a predefined condition, for which a fluctuation in the input voltage is expected, is detected;

a controller to selectively couple and decouple said power rail to said voltage stabilizer circuit in accordance with a detection result of said voltage fluctuation detector; and a clock supplied with power from said voltage stabilizer circuit and effective to count time.

37. A timepiece according to claim 36, wherein said electricity accumulator includes a capacitive device.

38. A timepiece comprising:

a power generator to generate power;

a first electricity accumulator to accumulate the power from said power generator;

a voltage multiplier to multiply a voltage of said first electricity accumulator with a multiplying amplification value dependent on a magnitude of the voltage of said first electricity accumulator;

a second electricity accumulator to accumulate the voltage multiplied by said voltage multiplier;

a power supply device including:

a power rail to supply power, said power rail being coupled to receive the accumulated voltage from said second electricity accumulator;

a voltage stabilizer circuit to produce a stabilized output voltage at an output node by stabilizing an input voltage coupled to said power rail, and for permitting said output node to follow voltage fluctuations in said input voltage when not coupled to said power rail; and a voltage fluctuation detector to detect a non-stable condition in which a fluctuation of predefined magnitude of frequency in said input voltage is detected or a predefined condition, for which a fluctuation in the input voltage is expected, is detected;

an amplification change detector to detect a change in the multiplying amplification value of said voltage multiplier;

a controller to selectively couple and decouple said power rail to said voltage stabilizer circuit in accordance with a result detected by said amplification change detector, and a clock supplied with power from said voltage stabilizer circuit and effective to count time.

39. A timepiece according to claim 38, wherein said first electricity accumulator includes a first capacitive device and wherein said second electricity accumulator includes a second capacitive device.

40. A portable electronic device according to claim 3, wherein said electricity accumulating means includes a capacitive device.

41. A portable electronic device according to claim 6, wherein said first electricity accumulating means includes a first capacitive device and wherein said second electricity accumulating means includes a second capacitive device.

42. A timepiece according to claim 14, wherein said electricity accumulating means includes a capacitive device.

43. A timepiece according to claim 15, wherein said first electricity accumulating means includes a first capacitive device and wherein said second electricity accumulating means includes a second capacitive device.

44. A power supply comprising:

a first power rail line;

a second power rail line;

a voltage stabilizer having first and second input nodes respectively coupled to said first and second power rail lines, and having an output node coupled to a third power rail line; and a transfer circuit responsive to a control input for selectively decoupling at least one of said first and second input nodes from its respective first and second power rail lines;

said voltage stabilizer being placed in an active mode effective for producing a stabilized output voltage on said third power rail line in response to both of said first and second power rail lines being coupled to said voltage stabilizer, and being placed in an inactive mode wherein voltage fluctuations in a predetermined one of said first and second power rail lines are reflected in said third power rail in response to said voltage stabilizer being decoupled from either of said first and second power rail lines, whereby a non-stabilized voltage is provided on said third power rail line;

said power supply being characterized by a first operating mode wherein the rate of change of charge in said first power rail is maintained below a predetermined value, and by a second operating mode wherein the rate of change of charge in said first power rail is above said predetermined value;

a power transfer selection circuit for applying a first pulse train at said control input when said power supply is detected to be in said first operating mode and for applying a second pulse train different from said first pulse train at said control input when said power supply is detected to be in said second operating mode.

45. The power supply of claim 44 wherein said second pulse train has the characteristic of maintaining said voltage stabilizer in said active mode for a longer cumulative time than said first pulse train when said first and second pulse trains are active for equal durations of time.

46. The power supply of claim 44, wherein said second pulse train has a greater duty cycle than said first pulse train.

47. The power supply of claim 44, further having an AC power generator for transferring varying amounts of power to said first and second power rail lines, said second operating mode being detected when the magnitude of said varying amounts of power transferred to said first and second power rail lines is above a second predetermined reference value.

48. The power supply of claim 44, further having a voltage translator of variable gain for applying a translated voltage across said first and second power rail lines, said second operating mode being detected in response to said voltage translator changing its gain.

49. The power supply of claim 44, further having a first circuit load coupled to said third power rail line, said first circuit load being intermittently active and effective for coupling an override signal to said control input of said transfer circuit during periods when said first circuit load is active, said first override signal being effective for preventing decoupling of said first and second power rail lines from said voltage stabilizer.

50. The power supply of claim 49, further having a second circuit load coupled to said third power rail line, said second circuit load being continuously active.

51. The power supply of claim 49, further having a load monitor for determining when said first circuit load will become active, and effective for issuing said first override signal a first predetermined time prior to said first circuit load becoming active and maintaining said first override signal issued until a second predetermined time after said first circuit load is no longer active.

52. The power supply of claim 49, wherein said first load is a driving circuit for a motor for use in a timepiece.

53. The power supply of claim 44, further having:

an AC power generator coupled to a voltage rectifier;

a first charge storage device for receiving charge from said voltage rectifier;

a power-transfer monitoring circuit for detecting said second operating mode in response to said voltage rectifier transferring charge to said first charge storage device.

54. The power supply of claim 53, wherein said first charge storage device is a capacitor.

55. The power supply of claim 53, wherein said first charge storage device is coupled to said first and second power rail lines through a voltage translator of variable gain, said voltage translator being effective for amplifying the voltage across said first charge storage device by said variable gain and coupling the resultant translated voltage to said first and second power rail lines, said second operating mode being detected in response to a change in said gain.

56. The power supply of claim 55 wherein said voltage translator alternates said gain between greater than 1, equal to 1, and less than 1 in response to the voltage across said first charge storage device.

57. The power supply of claim 55, further having a second charge storage device receiving said translated voltage from said voltage translator, said second charge storage device being coupled across said first and second power rail lines.

58. The power supply of claim 57, wherein said second charge storage device is a second capacitor.

59. A power supply comprising:

a first power rail line;

a second power rail line;

a voltage stabilizer having first and second input nodes respectively coupled to said first and second power rail lines, and having an output node coupled to a third power rail line;

a transfer circuit responsive to a control input for selectively decoupling at least one of said first and second input nodes from its respective first and second power rail lines;

said voltage stabilizer being placed in an active mode effective for producing a stabilized output voltage on said third power rail line in response to both of said first and second power rail lines being coupled to said voltage stabilizer, and being placed in an inactive mode wherein voltage fluctuations in a predetermined one of said first and second power rail lines are reflected in said third power rail in response to said voltage stabilizer being decoupled from either of said first and second power rail lines, whereby said voltage stabilizer alternates between said active mode and said inactive mode in response to said control input; and a power-usage selection circuit having a first clock input for receiving a first clocking signal and an override input for receiving an override signal, said power-usage selection circuit being effective for coupling said first clock input to said control input in the absence of said override signal, said power-usage selection circuit being further effective for applying a constantly ON signal at said control input in response to the actuation of said override signal, said constantly ON signal being effective for preventing decoupling of said first and second power rail lines from said voltage stabilizer, whereby said voltage stabilizer is maintained in said active mode.

60. The power supply of claim 59, wherein said power-usage selection circuit further includes a second clock input for receiving a second clocking signal and has a first clock selection input for receiving a first clock selection signal, said power-usage selection circuit being further effective for coupling said second clocking input to said control input in response to actuation of said first clock selection signal in the absence of said override signal.

61. The power supply of claim 60, further having a voltage fluctuation monitoring circuit for detecting a first condition wherein the voltage across said first and second power rail lines fluctuates at a rate below a predetermined reference value, and for detecting a second condition wherein the voltage across said first and second power rail lines fluctuates at a rate above said predetermined reference value or expected to rise above said predetermined reference value, said voltage fluctuation monitoring circuit having an output coupled to said first clock selection input for coupling said first clock input to said control input in response to said first condition being detected, and for coupling said second clock input to said control input in response to said second condition being detected.

62. The power supply of claim 60, wherein said second clocking signal has the characteristic of maintaining said voltage stabilizer in said active mode for a longer cumulative time than said first clocking signal when said first and second clock input are selected for equal durations of time.

63. The power supply of claim 60, wherein said second clocking signal has a greater duty cycle than said first clocking signal.

64. The power supply of claim 60, further having an AC power generator for transferring varying amounts of power to said first and second power rail lines, said first clock selection signal being actuated when the magnitude of said varying amounts of power transferred to said first and second power rail lines is above a second predetermined reference value.

65. The power supply of claim 60, further having a voltage translator of variable gain for applying a translated voltage across said first and second power rail lines, said first clock selection signal being actuated in response to said voltage translator changing its gain.

66. The power supply of claim 59, further having a first circuit load coupled to said third power rail line, said first circuit load being intermittently active and effective for maintaining said override signal actuated during periods when said second circuit load is active.

67. The power supply of claim 66, further having a load monitor for determining when said first circuit load will become active, and effective for actuating said override signal a first predetermined time prior to said first circuit load becoming active and maintaining said override signal actuated until a second predetermined time after said first circuit load is no longer active.

68. The power supply of claim 66, wherein said first circuit load is a driving circuit for a timepiece motor.

69. The power supply of claim 66, further having a power-transfer clocking circuit for providing said first clocking signal, said power-transfer clocking circuit being coupled to receive power from said third power rail line and being continuously active whereby said power-transfer clocking circuit is a second circuit load to said third power rail line.

70. The power supply of claim 59, wherein said power-usage selection circuit further has a second clock input for receiving a second clocking signal and has a first clock selection input for receiving a first clock selection signal, said power-usage selection circuit being further effective for coupling said second clocking input to said control input in response to actuation of said first clock selection signal in the absence of said override signal;

said power supply further having:

an AC power generator coupled to a voltage rectifier;

a first charge storage device for receiving charge from said voltage rectifier; and a power-transfer monitoring circuit for actuating said first clock selection signal in response to said voltage rectifier transferring charge to said first charge storage device.

71. The power supply of claim 70, wherein said second clocking signal has a greater duty cycle than said first clocking signal.

72. The power supply of claim 71, wherein said first clocking signal has a 1/8 duty cycle and said second clocking signal has a 1/2 duty cycle.

73. The power supply of claim 70, wherein said power-usage selection circuit further has a third clock input for receiving a third clocking signal and has a second clock selection input for receiving a second clock selection signal, said power-usage selection circuit being further effective for coupling said third clocking input to said control input in response to actuation of said second clock selection signal in the absence of said override signal; and wherein said first charge storage device is coupled to said first and second power rail lines through a voltage translator of variable gain, said voltage translator being effective for amplifying the voltage across said first charge storage device by said variable gain and coupling the resultant translated voltage to said first and second power rail lines, said voltage translator being further effective for actuating said second clock selection signal in response to a change in said gain.

74. The power supply of claim 73, wherein the said third clocking signal has a greater duty cycle than said second clocking signal.

75. The power supply of claim 74, wherein said second clocking signal has a greater duty cycle than said first clocking signal.

76. The power supply of claim 74, wherein said third clocking signal has a 3/4 duty cycle and said second clocking signal has a 1/2 duty cycle.

77. The power supply of claim 73, further having a second charge storage device receiving said translated voltage from said voltage translator, said second charge storage device being coupled across said first and second power rail lines.

78. The power supply of claim 77, wherein said second charge storage device is a capacitor.

79. A power supply comprising:

a first power rail line;

a second power rail line;

a voltage stabilizer having first and second input nodes respectively coupled to said first and second power rail lines, and having an output node coupled to a third power rail line;

a transfer circuit responsive to a control input for selectively decoupling at least one of said first and second input nodes from its respective first and second power rail lines;

said voltage stabilizer being placed in an active mode effective for producing a stabilized output voltage on said third power rail line in response to both of said first and second power rail lines being coupled to said voltage stabilizer, and being placed in an inactive mode wherein said third power rail line reflects voltage fluctuations in a predetermined one of said first and second power rail lines in response to said voltage stabilizer being decoupled from either of said first and second power rail lines;

a power-usage selection circuit having a first clock input for receiving a first clocking signal, a second clock input for receiving a second clocking signal, and a first selection input, said power-usage selection circuit being effective for selectively coupling one of said first and second clock inputs to said control input in response to said first selection input whereby said voltage stabilizer alternates between said active mode and said inactive mode in accordance with a selected one of said first and second clocking signals.

80. The power supply of claim 79, wherein said second clocking signal has the characteristic of maintaining said voltage stabilizer in said active mode for a longer cumulative time than said first clocking signal when said first and second clock inputs are separately selected for equal durations of time.

81. The power supply of claim 79, wherein said second clocking signal has a greater duty cycle than said first clocking signal.

82. The power supply of claim 79 further having a voltage fluctuation monitoring circuit for detecting a first condition wherein the voltage fluctuation rate across said first and second power rail lines is below a predetermined reference value, and for detecting a second condition wherein the voltage fluctuation rate across said first and second power rail lines is above said predetermined reference value or expected to rise above said predetermined reference value, said voltage fluctuation monitoring circuit having an output coupled to said first selection input for coupling said first clock input to said control input in response to said first condition being detected, and for coupling said second clock input to said control input in response to said second condition being detected.

83. The power supply of claim 79, further having an AC power generator for transferring varying amounts of power to said first and second power rail lines, and for effecting said first selection input to couple said second clock input to said control input when the magnitude of said varying amounts of power transferred to said first and second power rail lines is above a second predetermined reference value.

84. The power supply of claim 79, further having a voltage translator of variable gain for applying a translated voltage across said first and second power rail lines, and for effecting said first selection input to couple said second clock input to said control input in response to said voltage translator changing its gain.

85. The power supply of claim 79, further having:

an AC power generator coupled to a voltage rectifier;

a first charge storage device for receiving charge from said voltage rectifier; and a power-transfer monitoring circuit having an output coupled to said first selection input for selecting said second clocking signal in response to said voltage rectifier transferring charge to said first charge storage device.

86. The power supply of claim 85, wherein said a power-usage selection circuit further has a third clock input for receiving a third clocking signal, and a second selection input, said second selection input being effective for coupling said third clock input to said control input irrespective of said first clock selection input; and wherein said first charge storage device is coupled to said first and second power rail lines through a voltage translator of variable gain, said voltage translator being effective for amplifying the voltage across said first charge storage device by said variable gain and coupling the resultant translated voltage to said first and second power rail lines, said voltage translator being further effective for controlling said second selection input for applying said third clocking signal to said control input in response to a change in said gain.

87. The power supply of claim 86, wherein said third clocking signal has a larger duty cycle than said second clocking signal, and said second clocking signal has a larger duty cycle than said first clocking signal.

88. The power supply of claim 87, wherein said third clocking signal has a 3/4 duty cycle, said second clocking signal has a 1/2 duty cycle, and said first clocking signal has a 1/8 duty cycle.

89. The power supply of claim 86, further having a second charge storage device receiving said translated voltage from said voltage translator, said second charge storage device being coupled across said first and second power rail lines.

90. The power supply of claim 86, wherein said power-usage selection circuit further includes an override input for receiving an override signal, said power-usage selection circuit being further effective for applying a constantly ON signal at said control input in response to the actuation of said override signal, said constantly ON signal being effective for preventing decoupling of said first and second power rail lines from said voltage stabilizer.

91. The power supply of claim 90, further having a power-transfer clocking circuit having a first clock output coupled to said first clock input for providing said first clocking signal, said power-transfer clocking circuit being coupled to receive power from said third power rail line and being continuously active, whereby said power-transfer clocking circuit is a circuit load to said third power rail line.

92. The power supply of claim 90, further having a first circuit load coupled to said third power rail line, said first circuit load being intermittently active and effective for actuating said override signal during periods when said first circuit load is active.

93. The power supply of claim 92, further having a second circuit load coupled to said third power rail line, said second circuit load being continuously active.

94. The power supply of claim 92, further having a load monitor for determining when said first circuit load will become active, and effective for actuating said first override signal a first predetermined time prior to said first circuit load becoming active and maintaining said first override signal actuated until a second predetermined time after said first circuit load is no longer active.

95. The power supply of claim 92, wherein said first load is a driving circuit for a timepiece motor.

96. The power supply of claim 79, wherein said power-usage selection circuit further includes an override input for receiving an override signal, said power-usage selection circuit being further effective for applying a constantly ON signal at said control input in response to the actuation of said override signal, said constantly ON signal being effective for preventing decoupling of said first and second power rail lines from said voltage stabilizer.

97. The power supply of claim 96, further having a power-transfer clocking circuit having a first clock output coupled to said first clock input for providing said first clocking signal, said power-transfer clocking circuit being coupled to receive power from said third power rail line and being continuously active, whereby said power-transfer clocking circuit is a circuit load to said third power rail line.

98. The power supply of claim 96, further having a first circuit load coupled to said third power rail line, said first circuit load being intermittently active and effective for actuating said override signal during periods when said first circuit load is active.

99. The power supply of claim 98, further having a second circuit load coupled to said third power rail line, said second circuit load being continuously active.

100. The power supply of claim 98, further having a load monitor for determining when said first circuit load will become active, and effective for actuating said first override signal a first predetermined time prior to said first circuit load becoming active and maintaining said first override signal actuated until a second predetermined time after said first circuit load is no longer active.

101. The power supply of claim 98, wherein said first load is a driving circuit for a timepiece motor.

102. A power supply comprising:

a first power rail line;

a second power rail line;

a third power rail line;

a voltage stabilizer having first and second input nodes coupled to said first and second power rail lines, an output node coupled to said third power rail line, and a control input, said voltage stabilizer selectively providing one of a stabilized and an non-stabilized voltage output on said third power rail line as determined by said control input;

a rectifying circuit for intermittently transferring charge onto a first charge storage device, the transferring of charge onto said first charge storage device defining a first operating mode;

a voltage translator of variable gain for multiplying the voltage across said first charge storage device by a selected gain factor and transferring the resultant multiplied voltage onto said first and second power rails, said selected gain factor being changed in accordance with predefined voltage values across one of said first charge storage device and said first and second power rail lines, the changing of said selected gain factor defining a second operating mode;

a driving circuit issuing driving signals at discrete time intervals, the issuing of said driving signals by said driving circuit defining a third operating mode; and a selection circuit for controlling said control input of said voltage stabilizer, said selection circuit being effective for applying a default pulse sequence at said control input in the absence of said first, second, and third operating modes, effective for applying a first pulse sequence at said control input in response to said first operating mode in the absence of said second and third operation modes, effective for applying a second pulse sequence at said control input in response to said second operating mode in the absence of said third operating mode, and effective for applying a third pulse sequence at said control input in response to said third operating mode.

103. The power supply of claim 102 wherein said first, second, and third pulse sequences are different from said default pulse sequence.

104. The power supply of claim 102 wherein said default, first, second, and third pulse sequences are different from each other.

105. The power supply of claim 102, wherein said first pulse sequence has a higher duty cycle than said default pulse sequence, said second pulse sequence has a higher duty cycle than said first power sequence, and said third pulse sequence has a higher duty cycle than said second pulse sequence.

106. The power supply of claim 105, wherein said default pulse sequence has a 1/8 duty cycle, said first pulse sequence has a 1/2 duty cycle, said second pulse sequence has a 3/4 duty cycle, and said third pulse sequence has a 100% duty cycle.

107. The power supply of claim 105, wherein said first, second, and third pulse sequences are of similar frequency.

108. The power supply of claim 105, further having a power transfer monitoring circuit for determining when said rectifying circuit transfers charge onto said first storage device.

109. A method of supplying power to a first circuit load, said method comprising:

providing a first power rail line;

providing a second power rail line;

providing a third power rail line;

providing a voltage stabilizer having first and second input nodes selectively coupled to said first and second power rail lines, respectively, and having an output node coupled to said third power rail line;

selectively decoupling at least one of said first and second input nodes from its respective first and second power rail lines in response to a control signal;

placing said voltage stabilizer in an active mode effective for producing a stabilized output voltage on said third power rail line in response to both of said first and second power rail lines being coupled to said voltage stabilizer;

placing said voltage stabilizer in an inactive mode in response to either of said first and second power rail lines being decoupled from their respective first and second input node; and permitting said third power rail line to reflect voltage fluctuations in a predetermined one of said first and second power rail lines in response said voltage stabilizer being placed in said inactive mode, whereby a non-stabilized voltage is provided on said third power rail line.

110. The method of claim 109, further including:

monitoring for a first condition wherein the voltage across said first and second power rail lines fluctuates at rate below a predetermined reference value, and monitoring for a second condition wherein the voltage across said first and second power rail lines fluctuates at rate above said predetermined reference value or expected to rise above said predetermined reference value;

providing a first pulse train as said control signal in response to said first condition being detected; and providing a second pulse train as said control signal in response to said second condition being detected.

111. The method of claim 110 wherein said second pulse train is selected to have the characteristic of maintaining said voltage stabilizer in said active mode for a longer cumulative time than said first pulse train when said first and second pulse trains are active for equal durations of time.

112. The method claim 110, wherein said second pulse train is selected to have a greater duty cycle than said first pulse train.

113. The method of claim 109, further including:

providing an AC power generator for transferring varying amounts of power to said first and second power rail lines;

providing a first pulse train as said control signal when the magnitude of said varying amounts of power transferred to said first and second power rail lines is lower than a first predetermined reference value;

providing a second pulse train as said control signal when the magnitude of said varying amounts of power transferred to said first and second power rail lines is above said first predetermined reference value.

114. The method of claim 109, further including:

providing a voltage translator of variable gain for applying a translated voltage across said first and second power rail lines;

providing a first pulse train as said control signal when said voltage translator has a stable gain;

providing a second pulse train as said control signal in response to said voltage translator changing its gain.

115. The method of claim 109, further including:

providing a power-transfer clock supplying a pulse train as said control signal such that said voltage stabilizer alternates between said active mode and said inactive mode in response to said power-transfer clock.

116. The method of claim 115, further including:

supplying power to said power-transfer clock from said third power rail line.

117. The method of claim 115, wherein said pulse train is selected to have a 1/8 duty cycle such that said voltage stabilizer is in said active mode for 1/8 of each pulse period in said pulse train.

118. The method of claim 109, wherein said first circuit load is coupled to said third power rail line;

said first circuit load being intermittently made active and inactive;

and providing a first override signal as said control signal during periods when said first circuit load is made active, said first override signal being effective for preventing decoupling of said first and second power rail lines from said voltage stabilizer.

119. The method of claim 118, further including:

providing a second circuit load coupled to said third power rail line, and maintaining said second circuit load continuously active.

120. The method of claim 118, further including:

determining when said first circuit load will become active, issuing said first override signal a first predetermined time prior to said first circuit load becoming active and maintaining said first override signal issued until a second predetermined time after said first circuit load is no longer active.

121. The method of claim 118, wherein said first load is selected to be a driving circuit for a timepiece motor.

122. The method of claim 109, further including:

providing an AC power generator coupled to a voltage rectifier;

providing a first charge storage device for receiving charge from said voltage rectifier, said first charge storage device being coupled to said first and second power rail lines;

providing a second clocking signal as said control input in response to said voltage rectifier transferring charge to said first charge storage device, said second clocking signal being effective for alternating said voltage stabilizer between said active mode and said inactive mode at regular intervals.

123. The method of claim 122, wherein said second clocking signal is selected to have a 1/2 duty cycle such that said voltage stabilizer is in said active mode for half the time during each pulse period of said second clocking signal.

124. The method of claim 122, wherein said first charge storage device selected to be a capacitor.

125. The method of claim 122, further including:

providing a voltage translator of variable gain, wherein said first charge storage device is coupled to said first and second power rail lines through said voltage translator, said voltage translator being effective for amplifying the voltage across said first charge storage device by said variable gain and coupling the resultant translated voltage to said first and second power rail lines; and replacing said second clocking signal with a third clocking signal as said control signal in response to a change in said gain.

126. The method of claim 125 wherein said voltage translator is made to alternate its gain between being greater than 1, equal to 1, and less than 1 in response to the voltage across said first charge storage device.

127. The method of claim 125, wherein said third clocking signal is selected to have a larger duty cycle than said second clocking signal.

128. The method of claim 125, wherein said third clocking signal is selected to have a 3/4 duty cycle such that said voltage stabilizer is in said active mode for three quarters of the time during each pulse period of said third clocking signal.

129. The method of claim 125, further including:

providing a second charge storage device receiving said translated voltage from said voltage translator, said second charge storage device being coupled across said first and second power rail lines.

130. The method of claim 129, wherein said second charge storage device is selected to be a capacitor.

* * * * *